(12) United States Patent
Starbuck

(10) Patent No.: US 7,444,328 B2
(45) Date of Patent: Oct. 28, 2008

(54) KEYWORD-DRIVEN ASSISTANCE

(75) Inventor: Bryan T Starbuck, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 11/249,200

(22) Filed: Oct. 13, 2005

(65) Prior Publication Data

US 2006/0277210 A1 Dec. 7, 2006

Related U.S. Application Data

(63) Continuation-in-part of application No. 11/146,887, filed on Jun. 6, 2005.

(51) Int. Cl.
G06F 17/30 (2006.01)

(52) U.S. Cl. .......................................... 707/5
(58) Field of Classification Search ...................... 707/1, 707/3, 4, 100, 104, 5; 715/515
See application file for complete search history.

(56) References Cited

U.S. PATENT DOCUMENTS

| | | | |
|---|---|---|---|
| 5,913,215 A | 6/1999 | Rubinstein et al. | |
| 5,931,907 A | 8/1999 | Davies et al. | |
| 6,021,412 A * | 2/2000 | Ho et al. ................. | 707/104.1 |
| 6,094,649 A * | 7/2000 | Bowen et al. .................. | 707/3 |
| 6,141,662 A | 10/2000 | Jeyachandran | |
| 6,236,991 B1 | 5/2001 | Frauenhofer et al. | |
| 6,366,956 B1 | 4/2002 | Krishnan | |
| 6,735,632 B1 | 5/2004 | Kiraly et al. | |
| 6,789,076 B1 | 9/2004 | Dutta | |
| 6,832,224 B2 | 12/2004 | Gilmour | |
| 7,051,019 B1 * | 5/2006 | Land et al. ...................... | 707/4 |
| 7,299,222 B1 * | 11/2007 | Hogan et al. .................... | 707/3 |
| 2001/0009420 A1 * | 7/2001 | Kamiwada et al. .......... | 345/629 |
| 2002/0032750 A1 | 3/2002 | Kanefsky | |
| 2002/0103867 A1 | 8/2002 | Schilter | |
| 2003/0014490 A1 | 1/2003 | Bates et al. | |
| 2003/0046421 A1 | 3/2003 | Horvitz et al. | |
| 2003/0217052 A1 * | 11/2003 | Rubenczyk et al. ............ | 707/3 |
| 2004/0001093 A1 * | 1/2004 | Sellers et al. ................ | 345/766 |
| 2004/0024751 A1 * | 2/2004 | Petrisor et al. .................. | 707/3 |
| 2004/0039786 A1 | 2/2004 | Horvitz et al. | |

(Continued)

FOREIGN PATENT DOCUMENTS

CA 2265292 9/1999

(Continued)

Primary Examiner—Etienne P LeRoux
Assistant Examiner—Jerrod L Kearney
(74) Attorney, Agent, or Firm—Lee & Hayes, PLLC

(57) ABSTRACT

Embodiments of keyword-driven assistance are presented herein. Keyword assistance techniques are described which may be utilized to assist a user in finding particular electronically-stored items of instance. For example. one such technique may be utilized to perform searches of items based on a common meaning of the items as indicated by keywords of the items. The searches may be performed automatically such that a user interface which includes a display of a message may search for items which have similar meaning to the displayed message. In another example, a user interface may include a notes portion such that portions of the messages of particular interest to a user may be saved and organized based on closeness of keywords contained in the portions. A variety of other assistive techniques are also described.

17 Claims, 19 Drawing Sheets

| U.S. PATENT DOCUMENTS | | | | | |
|---|---|---|---|---|---|
| 2004/0230572 A1 | 11/2004 | Omoigui | WO | WO0169527 | 9/2001 |
| 2005/0160107 A1 | 7/2005 | Liang | WO | WO2005008426 | 1/2005 |

FOREIGN PATENT DOCUMENTS

| EP | 1077414 A2 * | 2/2001 |
|---|---|---|

* cited by examiner

300

302 { Features
UI: Pictures, Attachments
Search: MS Search, Shell
       ⏟         ⏟
       304       306

Work
Projects: Shell, Themes
Synchronization: Cell Phones
Meetings: Team, Interview

Email
Networking: Hotmail, IMAP, POP3
Customers: MVPS, Newsgroups
Security: Patch, Service Pack
APIs: SDK, NameSpace

Personal
Vacation: Europe, UK, London, Paris
San Diego: Tom, Kris, Nancy
Football: Schedules, Scores

Fig. 3

KEYWORD-DRIVEN ASSISTANCE

RELATED APPLICATIONS

The present application claims priority under 35 U.S.C. § 120 as a continuation-in-part of U.S. patent application Ser. No. 11/146,887, filed Jun. 6, 2005, and titled "Keyword Analysis and Arrangement", the entire disclosure of which is hereby incorporated by reference in its entirety.

BACKGROUND

Message communication has become and continues to be one of the most prevalent uses of computing devices, such as personal computers, wireless phones, and so on. For example, users may communicate, one to another, through the use of email, i.e., electronic mail. Email employs standards and conventions for addressing and routing such that the email may be delivered across a network, such as the Internet, utilizing a plurality of devices. Thus, users may receive email from over a company intranet and even across the world using the Internet The amount of email that is received by the user is ever increasing, however, and may consequently hinder the user's efficiency in dealing with each email. From work to personal use, for instance, users of email are increasingly exposed to larger and larger numbers of emails in a given day. Additionally, the user may not be able to readily differentiate between these different uses of email, and therefore not readily navigate to particular emails of interest. Further, these emails have ever increasing importance as users have come to trust and rely on email to receive a variety of content from bills to pictures of loved ones.

SUMMARY

Keyword assistance techniques are described which may be utilized to assist a user in finding particular electronically-stored items of instance. For example, one such technique may be utilized to perform searches items based on a common meaning of the items as indicated by keywords of the items. The searches may be performed automatically such that a user interface which includes a display of a message may search for items which have similar meaning to the displayed message. In another example, a user interface may include a notes portion such that portions of the messages of particular interest to a user may be saved and organized based on closeness of keywords contained in the portions. A variety of other assistive techniques are also described.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is an illustration in an exemplary implementation showing a keyword user interface configured to display a plurality of keywords from a plurality of hierarchical levels of a keyword hierarchy.

The same reference numbers are utilized in instances in the discussion to reference like structures and components.

DETAILED DESCRIPTION

Overview

Messages, such as email, are voluminous and consequently need better organization in order to enable a recipient of the messages to locate particular messages of interest. In a variety of implementations, techniques are described which may be utilized to organize email and other items, such as contacts, documents, instant messages, appointments, and so on. For example, a keyword extraction technique may be utilized to create a keyword index of stored emails and present a display of keywords in a user interface to allow the user to navigate to the emails and other items via the displayed keywords. For instance, an algorithm may be utilized to map out the closeness between keywords in emails and other items. Keywords, that have closeness values over a threshold may then be grouped together to create hierarchies of keywords. These hierarchies may be provided in a variety of ways, such as through 3-6 keyword "islands" (i.e., groups) that categorize a user's email.

Sub-categories of the islands may also be displayed to the user to allow the user to select a more specific keyword view of the categorized email. If the user is looking for a security patch, for example, the user may select the keyword "security" and emails having the keyword "security" are then retrieved and displayed for viewing by the user. This navigation technique may continue "down" through the hierarchy until the user locates the particular email of interest, such as by selecting another keyword "patch" for navigation to emails having the words "security" and "patch". Although email has been described, these navigation techniques may be utilized for a variety of electronically-storable items, such as contacts (e.g., electronically-stored names and addresses), appointments, documents, and so on.

The keyword techniques may be leveraged in a variety of ways to assist a user. One such technique may be utilized to perform search for similar items based on the determined "meaning" of a searched item, such as a currently displayed message. Another technique may be utilized to organize portions of items according to common meaning as indicated by keywords contained in the items. A further technique includes "learning" rules such that monitored interaction with an item having a particular meaning may be repeated for other items having that meaning.

In the following discussion, an exemplary environment is first described which is operable to employ techniques to provide keyword-driven assistance. Exemplary procedures and user interfaces are then described which are operable in the exemplary environment to provide the keyword-driven assistance techniques, as well as in other environments.

Exemplary Environment

Figure 1:
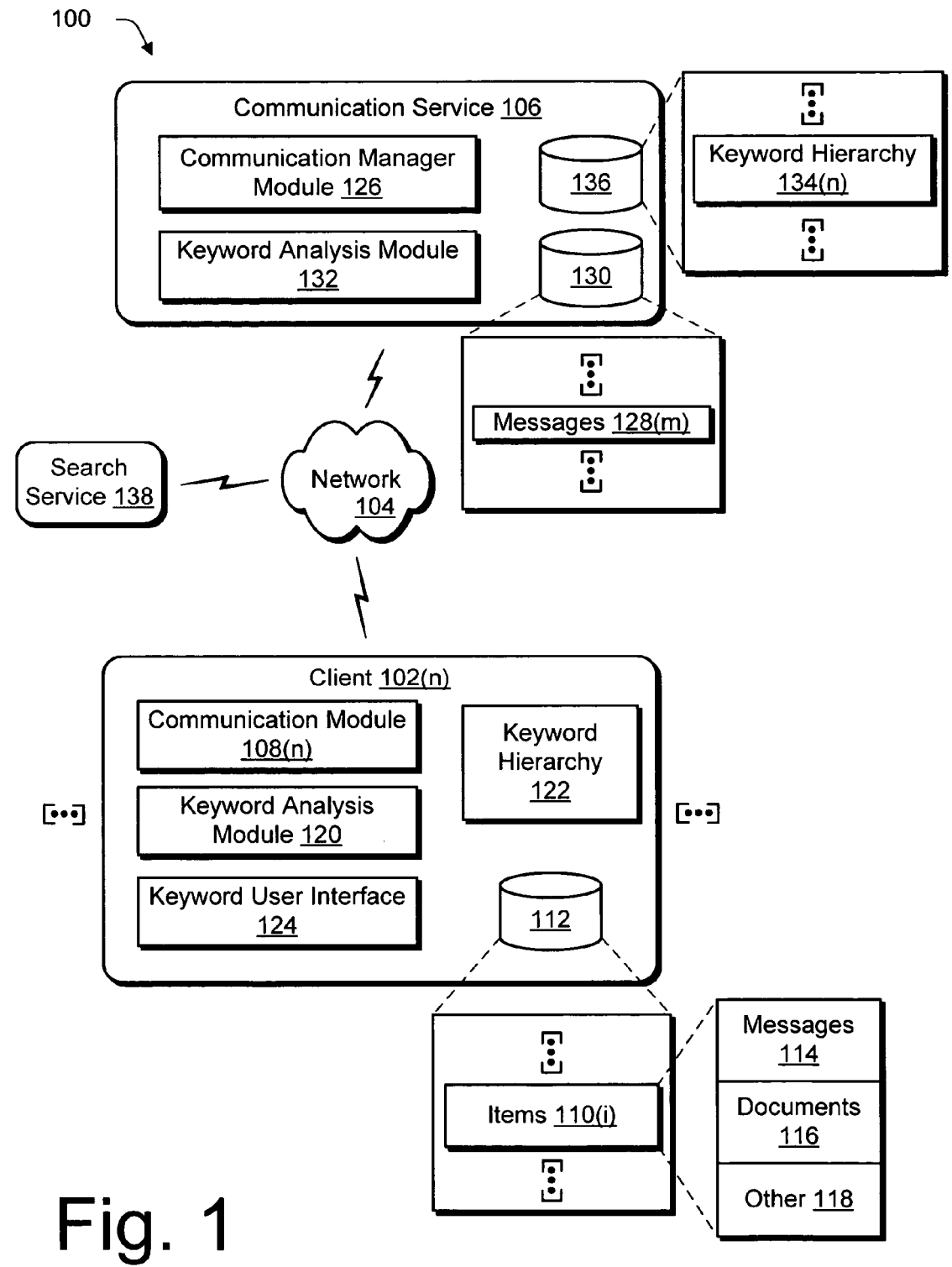
FIG. 1 is an illustration of an environment in an exemplary implementation that is operable to employ keyword-driven assistance techniques.

FIG. 1 is an illustration of an environment 100 in an exemplary implementation that is operable to employ keyword-driven assistance techniques. The environment 100 is illustrated as including a plurality of clients 102($n$) (where "n" can be any integer form one to "N") that are communicatively coupled, one to another, over a network 104. The plurality of clients 102($n$) may be configured in a variety of ways. For example, one or more of the clients 102($n$) may be configured as a computer that is capable of communicating over the network 104, such as a desktop computer, a mobile station, a game console, an entertainment appliance, a set-top box communicatively coupled to a display device, a wireless phone, and so forth. The clients 102($n$) may range from full resource devices with substantial memory and processor resources (e.g., personal computers, television recorders equipped with hard disk) to low-resource devices with limited memory and/or processing resources (e.g., traditional set-top boxes). In the following discussion, the clients 102($n$) may also relate to a person and/or entity that operate the client. In other words, the clients 102($n$) may describe a logical client that includes a user and/or a machine.

Additionally, although the network 104 is illustrated as the Internet, the network may assume a wide variety of configurations. For example, the network 104 may include a wide area network (WAN), a local area network (LAN), a wireless network, a public telephone network, an intranet, and so on. Further, although a single network 104 is shown, the network 104 may be configured to include multiple networks. For instance, a collection of the plurality of clients 102($n$) may be coupled via a peer-to-peer network to communicate, one to another. Each of these clients may also be communicatively coupled to a communication service 106 over the Internet. A variety of other examples are also contemplated. Each of the plurality of clients 102($n$) is illustrated as including a respective one of a plurality of communication modules 108($n$). In the illustrated implementation, each of the plurality of communication modules 108($n$) is executable on a respective one of the plurality of clients 102($n$) to send and receive messages. For example, one or more of the communication modules 108($n$) may be configured to send and receive email. As previously described, email employs standards and conventions for addressing and routing such that the email may be delivered across the network 104 utilizing a plurality of devices, such as routers, other computing devices (e.g., email servers), and so on. In this way, emails may be transferred within a company over an intranet, across the world using the Internet, and so on. An email, for instance, may include a header and a user-specified payload, such as text and attachments, e.g., documents, computer-executable files, and so on. The header contains technical information about the source and oftentimes may describe the route the message took from sender to recipient.

In another example, one or more of the communication modules 108($n$) may be configured to send and receive instant messages. Instant messaging provides a mechanism such that each of the clients 102($n$), when participating in an instant messaging session, may send text messages to each other. The instant messages are typically communicated in real time, although delayed delivery may also be utilized, such as by logging the text messages when one of the clients 102($n$) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received. Although messages configured as instant messages and emails have been described, messages may assume a variety of other configurations without departing from the spirit and scope thereof.

Each of the plurality of clients 102($n$) is illustrated as having a plurality of items 110($i$), where "i" can be any integer from one to "I", electronically stored in storage 112. The items 110($i$) may be configured in a variety of ways. For example, one or more of the items may be configured as messages 114 (e.g., email, instant messages, voicemail, and so on), documents 116, and other 118 electronically-storable data. As previously described, the quantity of items 110($i$) may become quite voluminous. For instance, the client 102($n$) may store thousands of email messages alone, as well as instant messages, documents, and so forth. In order to organize the plurality of items 10($i$), the client 102($n$) may employ a keyword analysis module 120 that is executable to generate a keyword hierarchy 122 for output in a keyword user interface 124.

The keyword analysis module 120 is representative of functionality which is executable to examine the plurality of items 110($i$), and more specifically words within the items 110(*i*), to determine the "meaning" of each of the items. The items may then be arranged accordingly to a keyword hierarchy 122 for output in the keyword user interface 124. Therefore, when a user of the client 102(*n*) wants to locate a specific item from the plurality of items 110(*i*), but does not remember a specific name, date and so on of the item, the user can navigate through keywords in the keyword hierarchy 122 to locate the desired item. In this way, the plurality of items 110(*k*) provide a "snapshot" of the world of the respective client 102(*n*) which may be utilized to categorize items 110(*i*) on the client 102(*n*). This may be utilized in a variety of ways. For example, the keyword analysis module 120 may analyze each of the plurality of items 110(*i*) on the client 102(*n*) to generate a keyword hierarchy 122 which is then utilized to organize messages of the client 102(*n*). Thus in this example, the "meaning" of the plurality of items 110(*i*) is used to organize a collection of the items.

Although execution of the keyword analysis module 120 on the client 102(*n*) has been described, the communication service 106 may also employ similar functionality. For example, the communication modules 108(1)-108(N) communicate with each other through use of the communication service 106. The communication service 106 is illustrated as including a communication manager module 126 (hereinafter "manager module") which is executable to route messages between the communication modules 108(1)-108(N). In an implementation, the communication service 106 may be configured to store and route email, such as through configuration as an email provider. For instance, one of the plurality of clients 102(*n*) may execute a respective communication module 108(*n*) to form an email for communication to another one of the plurality of clients 102(*n*). The communication module 108(*n*) communicates the email to the communication service 106, which is then stored as one of a plurality of messages 128(*m*), where "m" can be any integer from one to "M", which are stored in storage 130. The other client, to retrieve the email, "logs on" to the communication service 106 (e.g., by providing user identification and password) and retrieves emails from a corresponding account. In this way, the other client may retrieve corresponding emails from one or more of the plurality of clients 102(*n*) that are communicatively coupled to the communication service 106 over the network 104. Although messages configured as emails have been described, a variety of textual and non-textual messages (e.g., graphical messages, audio messages, and so on) may be communicated via the communication service 106 without departing from the sprit and scope thereof.

The communication service 106, through access to the plurality of messages 128(*m*) for each of the respective clients 102(*n*), also has access to a "snapshot" of the respective client's world. Therefore, the communication service 106 may execute a keyword analysis module 132 to generate a keyword hierarchy 134(*n*) for each of the plurality of clients 102(*n*), which are illustrated as stored in storage 136. These keyword hierarchies 134(*n*) may then be communicated from the communication service 106 to each of the respective clients 102(*n*) for output in a respective keyword user interface 124. Although a communication service 106 has been described, a variety of services may be utilized to generate keyword hierarchies for organization of items in keyword hierarchies for communication over a network 104 to the clients 102(*n*) based on items which correspond to the respective clients 102(*n*), such as any service that stores client data.

Processing of the messages and other items is not limited to a single client, for example, the communication service 106 may leverage messages 128(*m*) communicated by the plurality of clients 102(*n*) to determine "meaning". In other words, the "meaning" may be determined by messages and other items of the plurality of clients 102(*n*). Additionally, the keywords may leverage other sources of meaning, such as a search service 138. The search service 138, for instance, may be configured as an internet search engine which is utilized to locate web pages and other items both locally and remotely over the network 104. Therefore, the search service 138 may also provide "meaning" which may be utilized to navigate and arrange items, further discussion of which may be found in relation to FIG. 12

Generally, any of the functions described herein can be implemented using software, firmware (e.g., fixed logic circuitry), manual processing, or a combination of these implementations. The terms "module" and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the keyword techniques described below are platform-independent, meaning that the techniques may be implemented on a variety of commercial computing platforms having a variety of processors.

Figure 2:
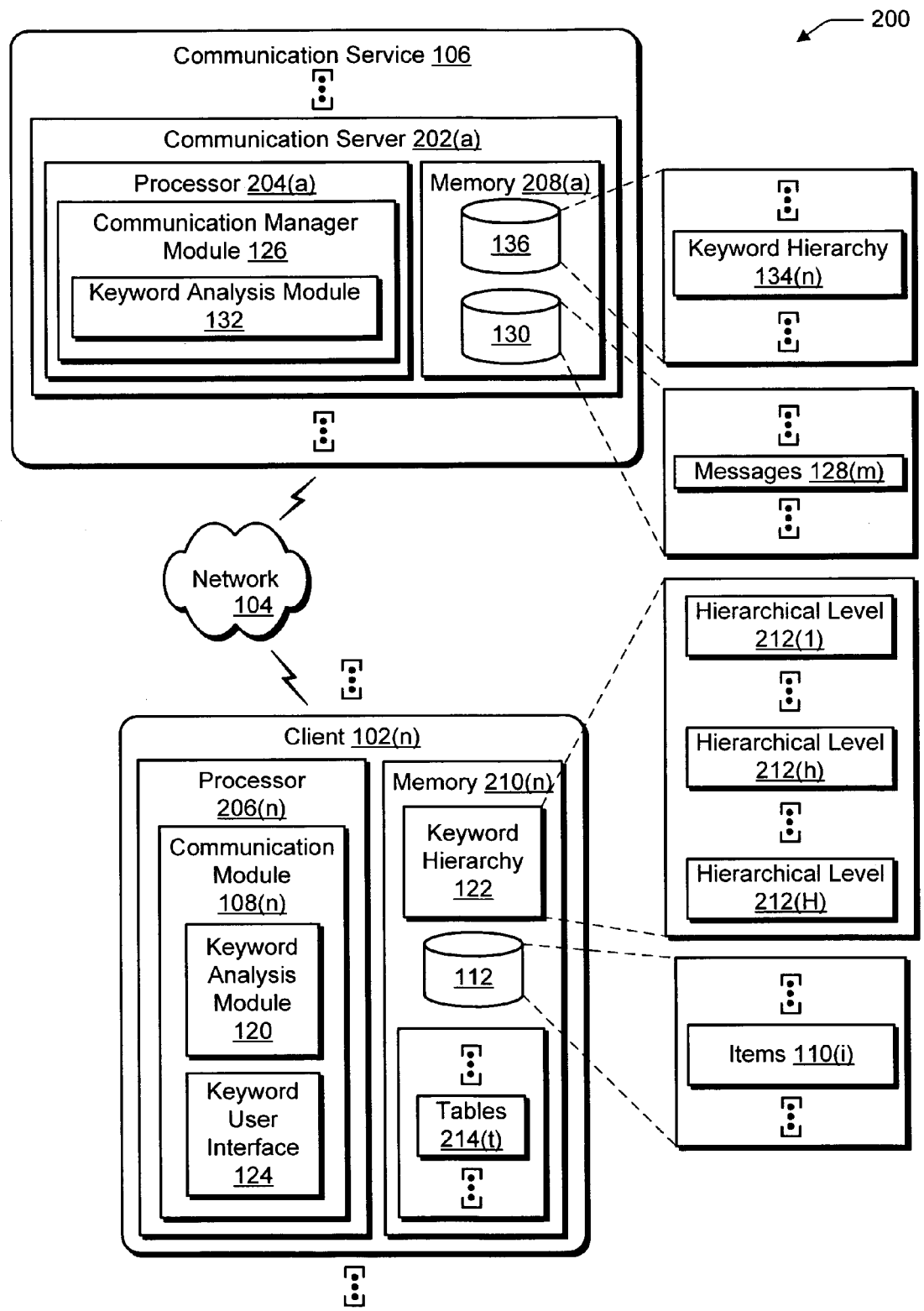
FIG. 2 is an illustration of a system in an exemplary implementation showing a plurality of clients and a communication service of FIG. 1 in greater detail.

FIG. 2 is an illustration of a system 200 in an exemplary implementation showing the plurality of clients 102(*n*) and the communication service 106 of FIG. 1 in greater detail. The communication service 106 is illustrated as being implemented by a plurality of communication servers 202(*a*) (where "a" can be any integer from one to "A") and the client 102(*n*) is illustrated as a client device. The communication servers 202(*a*) and the client 102(*n*) are each illustrated as having a respective processor 204(*a*), 206(*n*) and a respective memory 208(*a*), 210(*n*).

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 208(*a*), 210(*n*) is shown, respectively, for the communication servers 202(*a*) and the clients 102(*n*), a wide variety of types and combinations of memory may be employed, such as random access memory (RAM), hard disk memory, removable medium memory, and so forth. For example, the keyword hierarchy 122 may be stored in RAM and the storage 112 for the plurality of items 110(*i*) may be implemented by one or more hard disk drives.

The keyword analysis module 120 and the keyword user interface 124 are illustrated in FIG. 2 as included within the communication module 108(*n*) to indicate that the communication module may employ this functionality. The keyword analysis module 120, when executed, may calculate keywords for each of the plurality of items 110(*i*) stored on the client 102(*n*) to define its respective primary "meaning". The keyword analysis module 120 may then create links between the items 10(*i*) to each keyword in the keyword hierarchy 122. References to people in the items 110(*i*) may also be treated as keywords. For instance, such "people" keywords may be indicated as such differently in the keyword user interface 124 than other "non-people" keywords, further discussion of which may be found in relation to FIG. 10.

The plurality of keywords generated by the keyword analysis module 120 through analysis of the plurality of items 110(i) may be arranged in one or more of a plurality of hierarchical levels 212(1), ..., 212(h), ..., 212(H) of the keyword hierarchy 122. This analysis may be performed in a variety of ways. For example, the keyword analysis module 120 may examine each of the plurality of items 110(i) to derive a group of keywords. Data from the examination may be placed in one or more of a plurality of tables 214(t), where "t" can be any integer from one to "T". For example, the tables 214(t) may be configured as keyword tables, word histogram tables, synonym tables, hyperlink tables, and so on which describe data "mined" from the items 110(i), further discussion of which may be found in relation to FIG. 10.

The keywords, for instance, may then be arranged in the plurality of hierarchical levels based on the number of occurrences of each of the keywords, one to another. Links from the keywords to the plurality of items 110(i) may be created such that when the plurality of hierarchical levels 212(1)-212(H) are displayed in the keyword user interface 124, a user of the client 102(n) of FIG. 2 may navigate to the items 110(i) having the keywords. In another example, a subset of the vocabulary utilized by the plurality of items 10(i) that is "meaningful" is generated. In a further example, keyword phrases that include a plurality of keywords are generated. A variety of other examples are also contemplated.

The keyword user interface (UI) 124 may then display the keyword hierarchy 122 for viewing by a user. The keyword UI 124 may be configured in a variety of ways. For instance, the keyword UI 124 may include functionality such that the client 102(n) may toggle between people keywords, non-people keywords, and both. The client 102(n) may also use the keyword UI 124 to "drill down" into subcategories (e.g., "child" hierarchical levels) to find a specific keyword and see items that map to that specific keyword. The keywords in the keyword hierarchy 122, as displayed in the keyword UI 124, may also be selectable such that keywords in different "branches" of the keyword hierarchy 122 may be combined to search for a particular item. In this way, the keyword UI 124 may be utilized to "triangulate" to a specific topic represented by a collection of keywords, further discussion of which may be found in relation to FIG. 5. Thus, the keyword user interface 124 provides a technique for the client 102(n) to navigate through a large number of items (e.g., over 10 million) to a subset of the items (e.g., from 1 to 30 items) within one to four selections, e.g., "clicks" in the keyword user interface 124, in a way that is readily understood by the client 102(n). The keyword user interface 124 may be configured in a variety of ways, illustrations of which may be found in relation to the following FIGS. 3-5.

Exemplary User Interfaces

FIG. 3 is an illustration in an exemplary implementation showing a keyword user interface 300 configured to display a plurality of keywords from a plurality of hierarchical levels of a keyword hierarchy. The keyword UI 300 provides a display of a plurality of keywords that are arranged into hierarchical levels. For example, the keyword "features" is a root level of a hierarchy that is a parent to another keyword "search". Thus, the keyword "search" is positioned in a hierarchical level 304 that is a "child" of the root level 302. Likewise, the keywords "MS Search" and "Shell" are positioned in another hierarchical level 306 that is a child to the previous child hierarchical level having the keyword "search".

As shown in FIG. 3, a plurality of hierarchies may be displayed, which are illustrated as "features", "work", "email" and "personal". Each of these hierarchies further displays multiple keywords which are positioned at different respective levels of the hierarchy. In this way, a user, when viewing the user interface, may see multiple branches of different hierarchies of keywords utilized for categorizing items.

Figure 4:
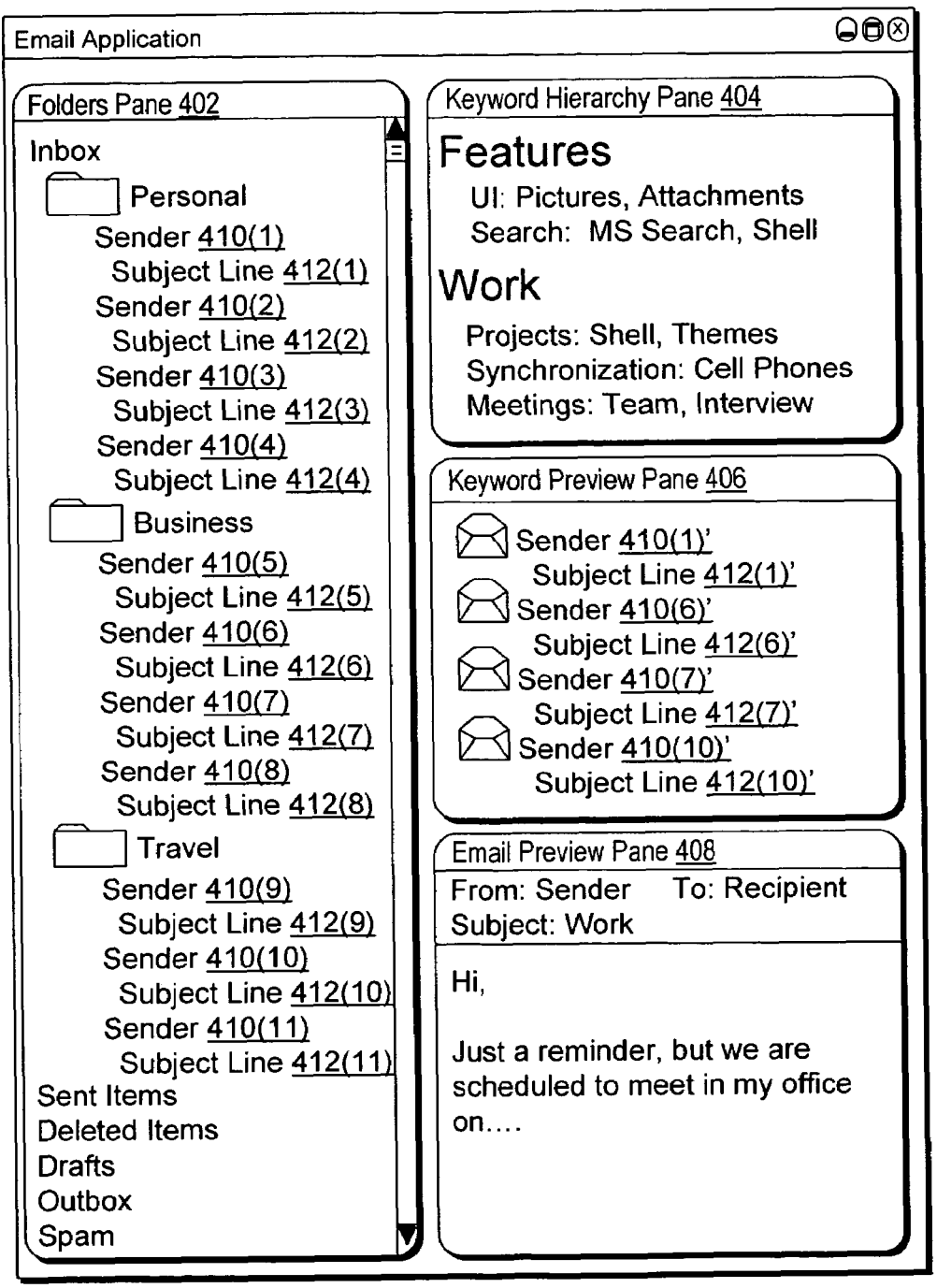
FIG. 4 is an illustration in an exemplary implementation showing an email user interface which includes the keyword user interface of FIG. 3 as organizing a plurality of emails according to a keyword hierarchy.

FIG. 4 is an illustration in an exemplary implementation showing an email user interface 400 which includes the keyword user interface 300 of FIG. 3 as organizing a plurality of emails according to a keyword hierarchy. The email user interface includes a folders pane 402, a keyword hierarchy pane 404, a keyword preview pane 406 and an email preview pane 408.

The folders pane 402 includes representations of a plurality of folders which may be utilized to organize email, the illustrated examples including an "inbox", "sent items", "deleted items", "drafts", "outbox" and "spam". These folders may also include sub-folders, the illustrated examples including "personal", "business" and "travel". The sub-folders in this example include a plurality of representations of email messages, each of which having a respective sender 410(1)-410(11) line and a respective subject line 412(1)-412(11).

The keyword hierarchy pane 404 includes a portion of the user interface 300 of FIG. 3. Email messages that correspond to keywords selected in the keyword hierarchy pane 404 are displayed in the keyword preview pane 406. For instance, email messages having the respective sender 410(1), 410(6), 410(7), 410(10) and subject lines 412(1), 412(6), 412(7), 412(10) are displayed in the keyword preview pane as having sender lines 410(1)', 410(6)', 410(7)', 410(10)' and subject lines 412(1)', 412(6)', 412(7)', 412(10)'. Thus, the client may navigate through the keyword hierarchy pane 404 and have results of that navigation displayed concurrently in the keyword preview pane 406. Further, a message in the keyword preview pane 406 may be selected to display at least a portion of its contents in the email preview pane 408.

Figure 5:
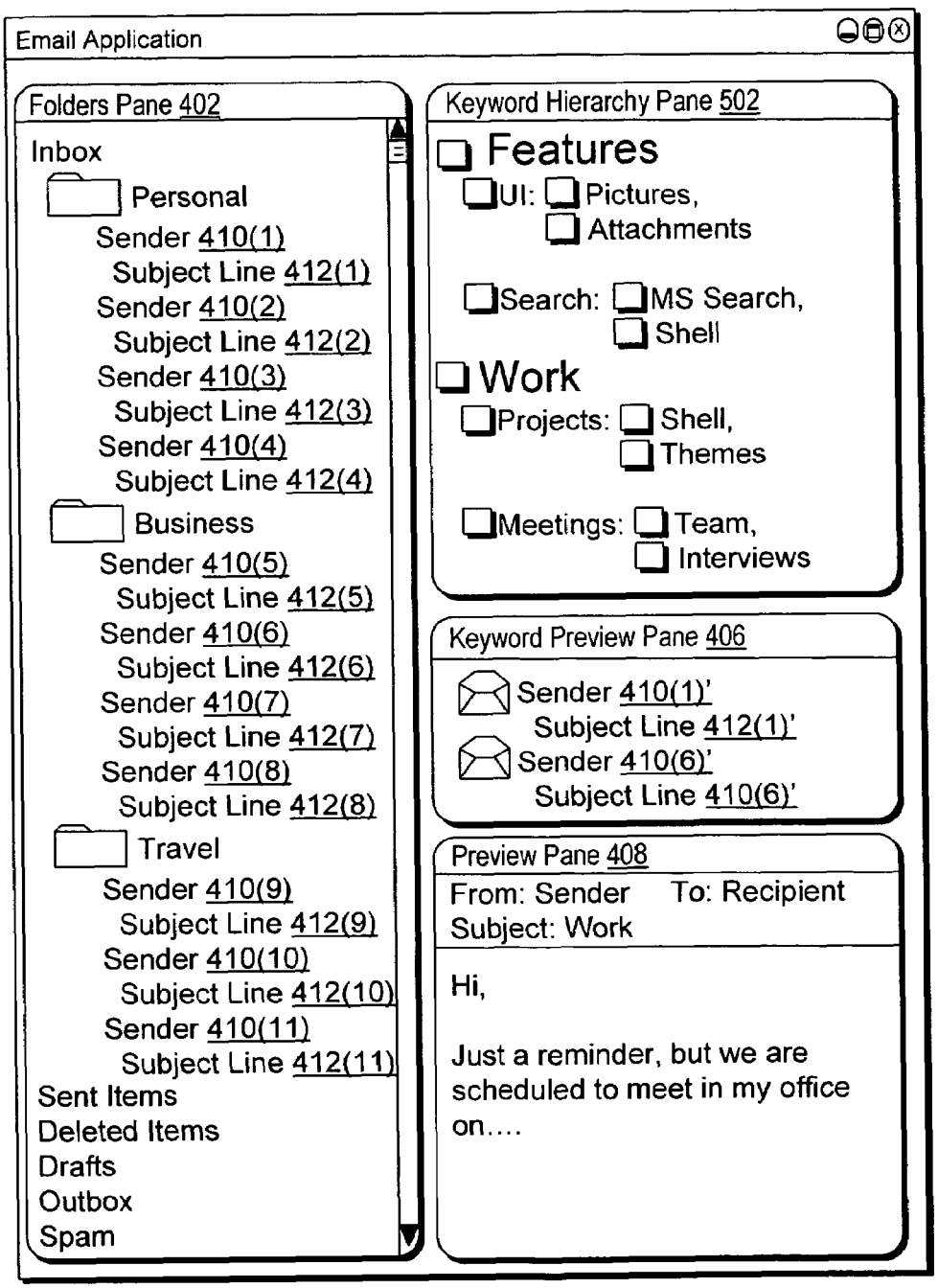
FIG. 5 is an illustration in an exemplary implementation showing an email user interface which includes the keyword user interface of FIG. 3 as organizing a plurality of emails according to a keyword hierarchy such that a plurality of the keywords are selectable to navigate to emails having the selected keywords.

FIG. 5 is an illustration in an exemplary implementation showing an email user interface 500 which includes the keyword user interface 300 of FIG. 3 as organizing a plurality of emails according to a keyword hierarchy such that a plurality of the keywords are selectable to navigate to emails having the selected keywords. Like the user interface 400 of FIG. 4, the user interface 400 includes a folders pane 402 for display of folders for storing email, a keyword preview pane 406 for displaying a result of navigation through a keyword hierarchy pane 502, and a preview pane 408 for display of messages selected in the keyword preview pane 406 and/or the folders pane 402.

The keyword hierarchy pane 502 of the user interface 500 of FIG. 5 is configured to accept a plurality of selections (e.g., through use of a cursor control device) by the client of keywords at any one time to navigate to emails having one or more of the selected keywords. The keyword hierarchy pane 502 is illustrated as including a "check box" for each keyword included in the keyword hierarchy pane 502. By selecting a keyword, the keyword preview pane 406 may "navigate to" to emails having that keyword. Likewise, by unselecting a selected keyword, the keyword preview pane 406 may "navigate from" emails having that keyword. Thus, the client may simply "click" through the displayed keyword to navigate through the emails to locate a particular email of interest. In an implementation, indications may be provided by each of the results to indicate a "closeness" of the item to the selected keywords, such as by displaying varying numbers of stars.

Figure 6:
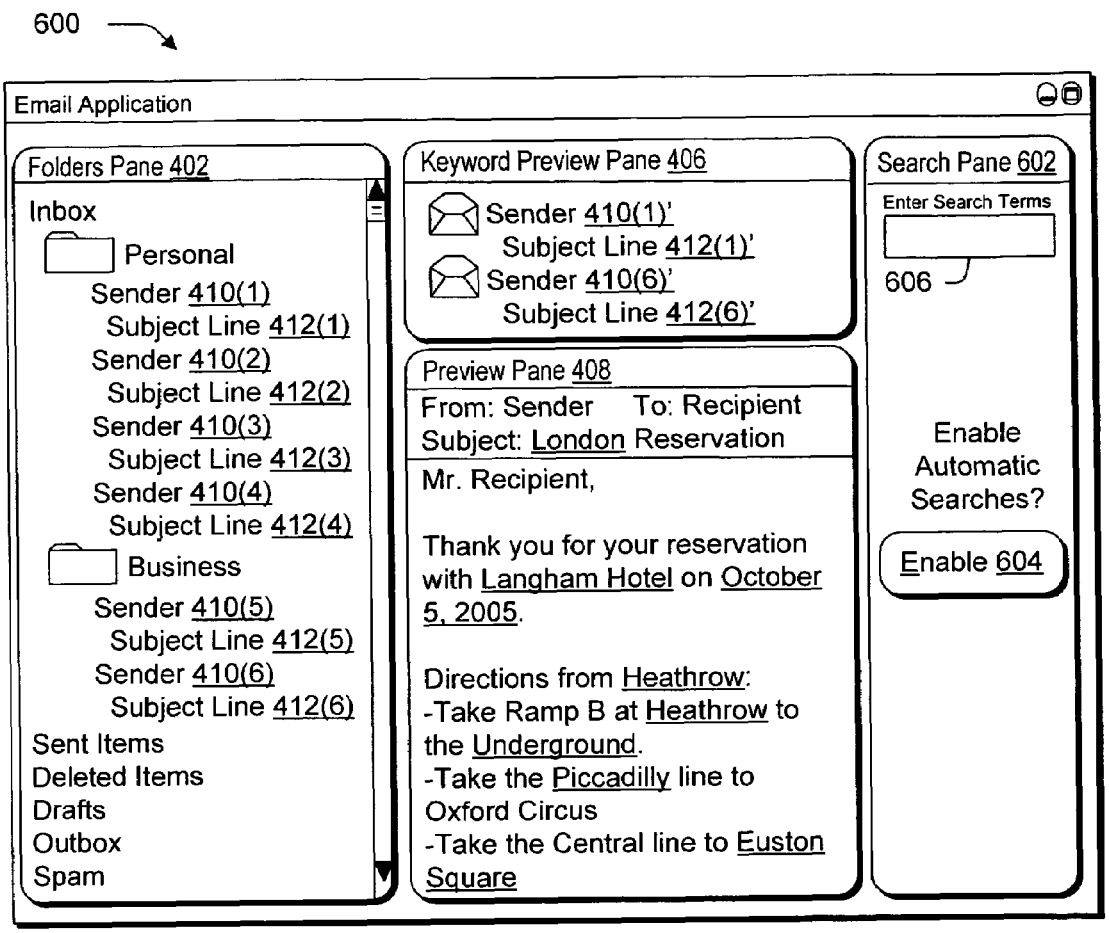
FIG. 6 is an illustration in an exemplary implementation showing an email user interface which includes a search pane.

FIG. 6 is an illustration in an exemplary implementation showing an email user interface 600 which includes a search pane 602. The user interface 600 includes a folders pane 402, a keyword preview pane 406 and a preview pane 408 as previously described in relation to FIG. 4. Additionally, the search pane 602 is provided to enable a user to search for items, either locally on the client 102(n) and/or remotely over the network 104. For example, the user may enter keywords in an entry portion 604 of the search pane 602 to search for items (e.g., emails) that are stored locally on the client 102(n) which have the keywords. Additionally, the keywords may be utilized in "automatic searches" for related items over the network 104 of FIG. 1, such as web pages, advertisements, and so on.

To provide the user with the ability to decide whether or not to utilize this functionality, an "enable" button 606 is provided in the user interface 600 along with related text that queries the user as to whether to "enable automatic searches". In an implementation, the "enable" button 604 enables searches to be performed for items that are available remotely over the network 104, such as newsgroups, web pages, and so on. For instance, when the "enable" button is not selected by the user, searches for items local to the client 102(n) may be performed locally without communicating with the search service 138 over the network 104. When the enable button 604 has been selected, searches for both locally stored items 110(i) and items which are available over the network 104 may be performed. A variety of other instances are also contemplated, e.g., such as by searching for items that are available remotely and not for locally stored items.

A privacy 608 hyperlink is also provided which, when selected, provides the user with additional information regarding how the feature works, where the data is stored, what data is stored at the client and/or a server (e.g., communication server 202(a) of the communication service 106), what information is sent to the server and how often, and so forth. Further discussion of the enable button may be found in relation to FIG. 10 as well as the following figures.

Figure 7:
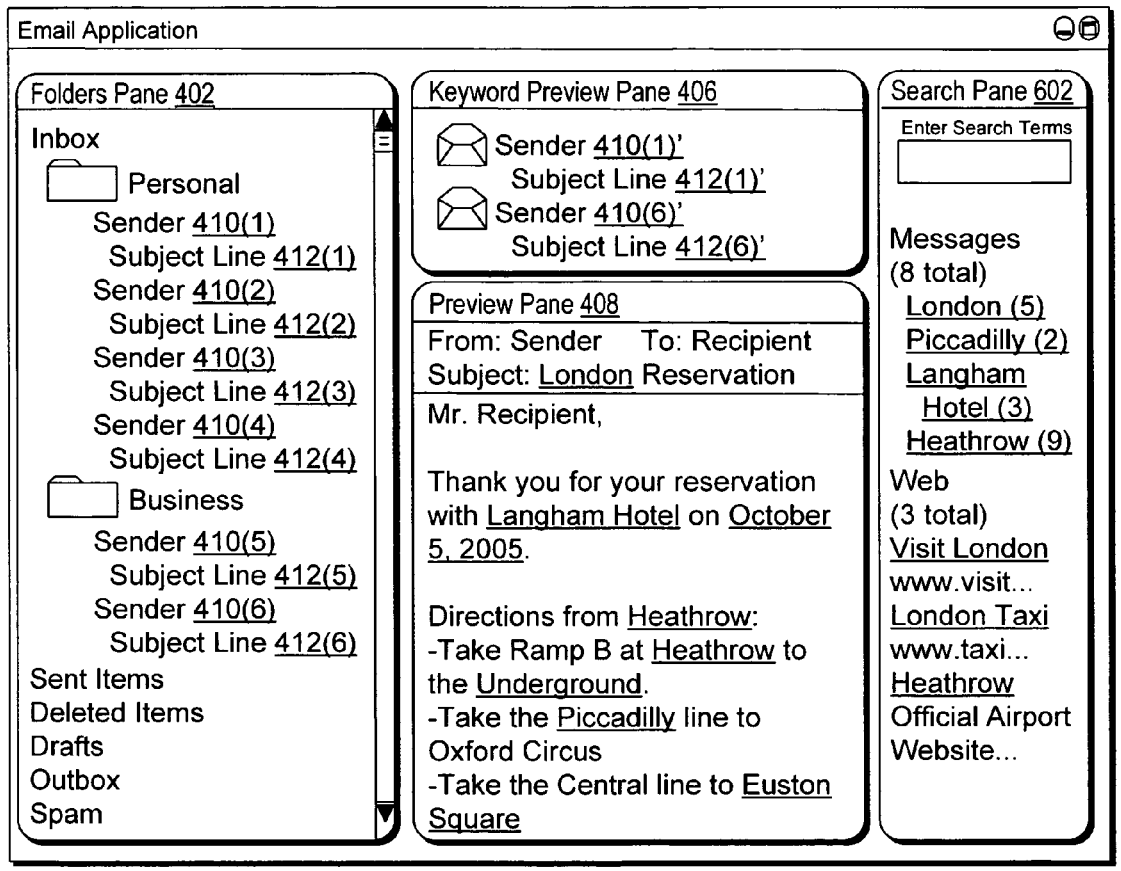
FIG. 7 is an illustration of a user interface having the search pane of FIG. 6 which is enabled to provide automatic searches.

FIG. 7 is an illustration of a user interface 700 having the search pane 602 of FIG. 6 as enabled to provide automatic searches. As illustrated, a user has entered the search term "London" into the entry portion 604, which resulted in a search being performed for items local to the client 102(n) (e.g., messages) and items accessible remotely over the network 104, e.g., web sites having web pages. Thus, the search term "London" may be treated as a keyword to search for items having that keyword. The search results are displayed within the search pane 602, which in this instance include messages and web sites.

In the illustrated user interface 800, eight total messages were located as a result of the search for the keyword "London". The messages, as a group, have five occurrences of the keyword "London", two occurrences of the keyword "Piccadilly", three occurrences of the keyword "Langham Hotel" and nine occurrences of the keyword "Heathrow". Selection of the keywords for arrangement of the messages and web sites may be performed as previously described by determining a relative closeness of the keywords, one to another, in order to determine the "meaning" of the messages. Messages having similar "meanings" may be grouped together under common keywords as previously described. Thus, the keyword management techniques may be utilized to organize search results as well as to obtain additional search results (e.g., items) which, while related to the searched keyword, do not necessarily include the searched keyword. For instance, in the user interface 800 eight messages were located, but only five occurrences of the keyword "London" occur in the eight messages.

The search performed through the search pane 602 may also leverage items currently being displayed. For example, the search "London", when performed, may also be based on the message being displayed in the preview pane 408. The keyword analysis module 120, for instance, may determine whether any keywords contained in the message are sufficiently related (e.g., "close") to the searched keyword to be utilized in conjunction with the search. If so, the search may be performed that also addresses the determined "close" keywords, such as by performing multiple searches for the original keyword, the original keyword and other "close" keywords, and so on. Again, the results of these searches may then be grouped together using the keyword arrangement techniques as previously described.

In another example, the search being performed in the search pane 602 is done automatically based on a current message being displayed, such as the message in the preview pane 408. The search may leverage keywords found in the message and locate messages having the same and similar (e.g., "close") keywords. Thus, in this example, the search pane 602 may provide search results that contain related messages and other items (e.g., such as web pages, documents, music, contacts, and so on) as the user selects messages for display. In this example, the "most relevant" keyword utilized to perform the search may be placed automatically in the entry portion 604 to inform the user as to which term was deemed the most relevant when performing the search by the keyword analysis module 122.

In a further example, the user may manually select one or more of the keywords from a message being displayed, which then automatically causes the search pane 602 to perform a search using the selected keyword. The user, for instance, may select the keyword "London" from the subject line of a message being displayed in the preview pane 408 using a cursor control device, which causes the keyword to be entered automatically in the entry portion 604 of the search pane 602. A variety of other examples are also contemplated, further discussion of which may be found in relation to FIG. 10.

Figure 8:
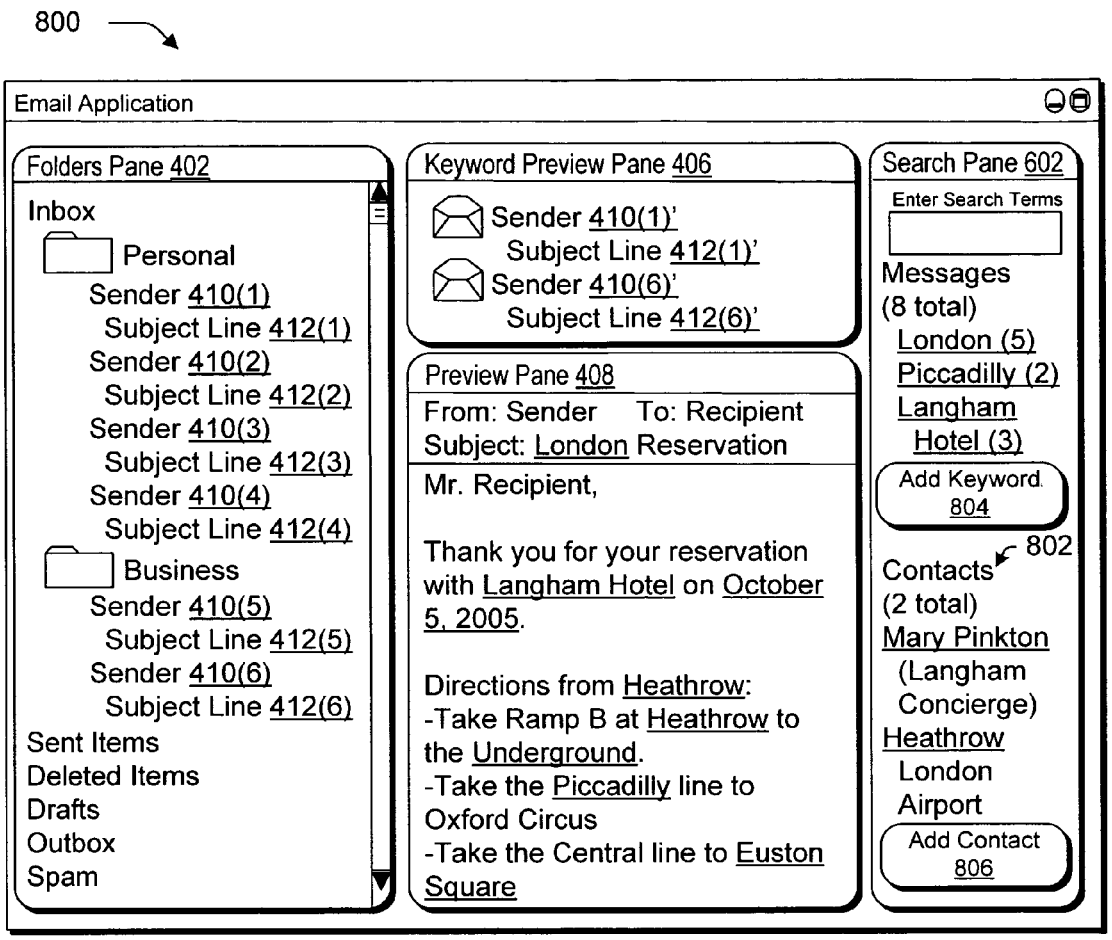
FIG. 8 is an illustration of a user interface having the search pane of FIG. 6 as enabled to provide automatic searches that include messages and contacts.

FIG. 8 is an illustration of a user interface 800 having the search pane 602 of FIG. 6 as enabled to provide automatic searches that include messages and contacts. In this search pane 602, keywords contained in the messages as a result of an automatic search are displayed as previously described. Additionally, contacts 802 which relate to the message are also described. For example, keywords contained in the currently-displayed message in the preview pane 408 may be common to messages communicated to particular contacts. These contacts 802 may then be displayed in the search pane 602 to navigate to other items (e.g., messages) from those contacts. Thus, in this example the contacts are also treated as keywords, with keywords contained in items related to those contacts being used to determine closeness of the contact to the currently-displayed message. Further discussion of contacts and keywords may be found in relation to FIG. 11.

The search pane 602 also includes "add keyword" 804 and "add contact" 806 buttons which may be utilized to specify specific keywords and contacts for inclusion in the search results. For example, the user may highlight the keyword phrase "Euston Square" and select the "add keyword" button 804 to cause that keyword phrase and associated search results to be included in the search pane 602. For instance, the keyword "Euston Square" may displace the keyword "Langham Hotel" in the search pane 602 and be selectable to navigate to messages having "Euston Square". Similar functionality may also be employed using the "add contact" 806 button.

Figure 9:
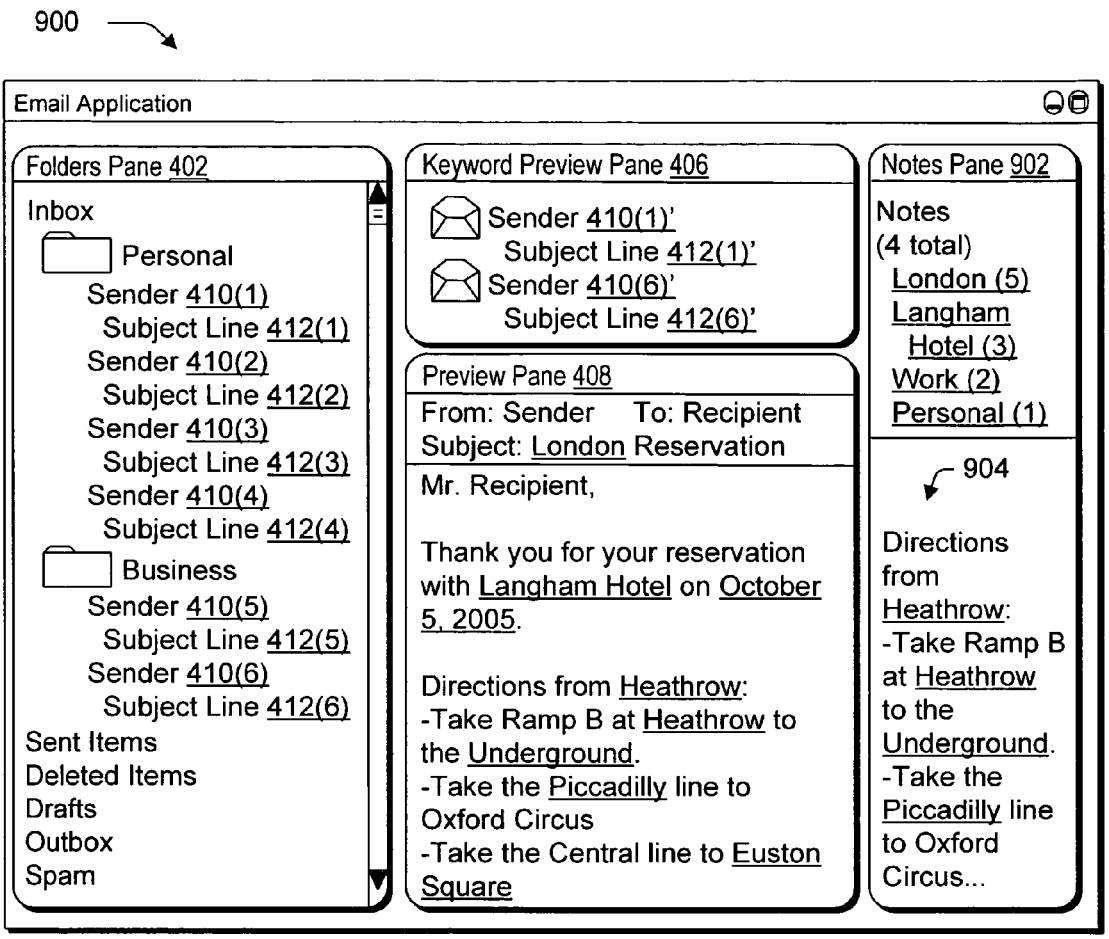
FIG. 9 is an illustration of an email user interface having a notes pane.

FIG. 9 is an illustration of a user interface 900 having a notes pane 902. The user interface 900 includes a folders pane 402, a keyword preview pane 406 and a preview pane 408, as previously described in relation to FIGS. 4 and 6. Additionally, the notes pane 902 is included to store portions of messages of the user interface. For example, an email message is displayed in the preview pane 408 which includes direction to the Langham Hotel from Heathrow airport. The user may select the directions to be copied from the displayed message to the notes pane, which are displayed as a portion 904 (i.e., the "note") of the message in the notes pane 902. In an implementation, the copied portion 904 continues to "exist" (i.e., stored electronically) even after the original message has been deleted. Therefore, the user may store portions of messages without having to save the entirety of the message, thereby conserving memory and display resources.

The notes may also take advantage of the keyword arrangement techniques previously described. For example, keywords contained in the portions (i.e., the notes) accessible via the notes pane 902 may be grouped according to keywords contained in the portions. Thus, the portions are also "items" that may be organized based on the determined "meaning" of the notes, e.g., closeness of the keywords contained in the items, one to another. Further discussion of the notes portion may be found in relation to FIG. 13.

Although navigation through messages (e.g., email) has been generally described in the preceding examples, similar functionality may be employed for other electronically-storable items, such as appointments, contacts, documents, and so on. Therefore, although some of the following procedures refer to an email environment, a variety of other environments are also contemplated without departing from the spirit and scope thereof.

Exemplary Procedures

The following discussion describes keyword analysis and arrangement techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2 and the user interfaces 300-900 of FIGS. 3-9.

Keyword Assistance

Figure 10:
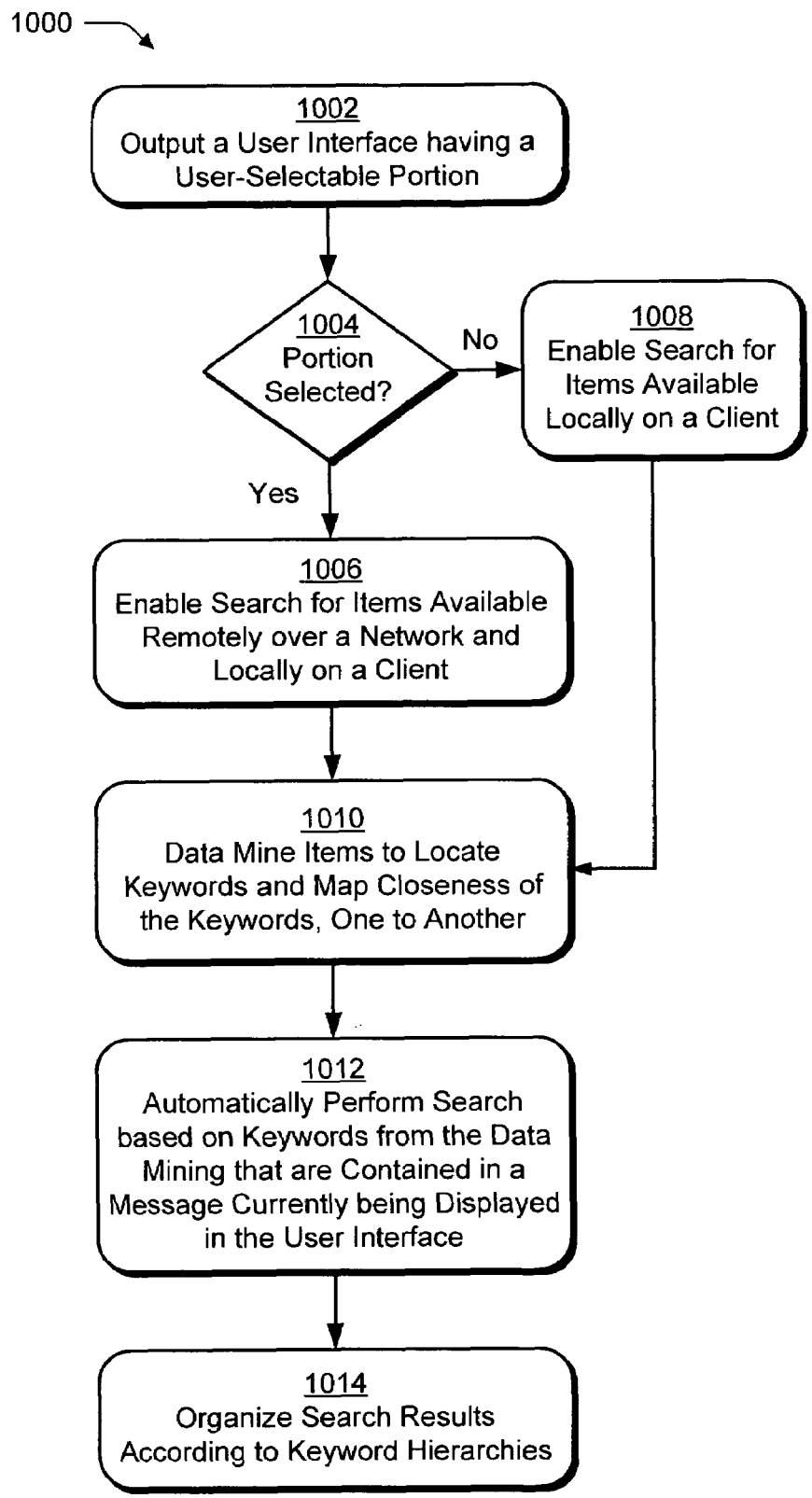
FIG. 10 is a flow diagram depicting a procedure in an exemplary implementation in which a user interface includes a selectable portion to enable automatic searching of remotely-located items.

FIG. 10 is a flow diagram depicting a procedure 1000 in an exemplary implementation in which a user interface includes a selectable portion to enable automatic searching of remotely-located items. A user interface having a user-selectable portion is output (block 1002). For example, an "enable" button 604 may be output in the user interface 600 to enable automatic searches. A determination is then made as to whether the portion is selected (decision block 1004). If so ("yes" from decision block 1004), searches are enabled for items that are available remotely over a network and locally on a client (block 1006). If not ("no" from decision block 1004), searches are enabled for items available locally on the client (block 1008). Thus, the user may "opt out" of remote search through use of the user-selectable portion of the user interface.

Items are then data mined to locate keywords and map closeness of the keywords, one to another (block 1010). As previously described, the closeness of the keywords may be used to determine a meaning of each of the items. Therefore, the data mining determines meaning of items from the keywords and thus, may utilize this meaning to locate and group particular items of interest.

For example, a search may be automatically performed based on keywords from the data mining that are contained in a message currently being displayed in the user interface (block 1012). The user interface 700 of FIG. 7, for instance, may locate keywords contained in the message of the preview pane 408 that were found by data mining items. These keywords may then be utilized to find "similar" items (e.g., remotely and/or locally) to the displayed message. Thus, the user interface may automatically display related items such that a user may navigate to the items without manually entering search terms.

As previously described, the user may also manually enter additional search terms in the entry portion 606 of the user interface 600 to have those terms and the currently-displayed message utilized to perform a search. Additionally, the keyword techniques may also be utilized to organize the search results according to keyword hierarchies (block 1014). Thus, the user is readily informed as to how the results of the search relate to the currently-displayed message. As previously described, a wide variety of related-items may be found, such as other messages (e.g., instant messages and email), documents, web pages, newsgroups, contacts, and so on.

Figure 11:
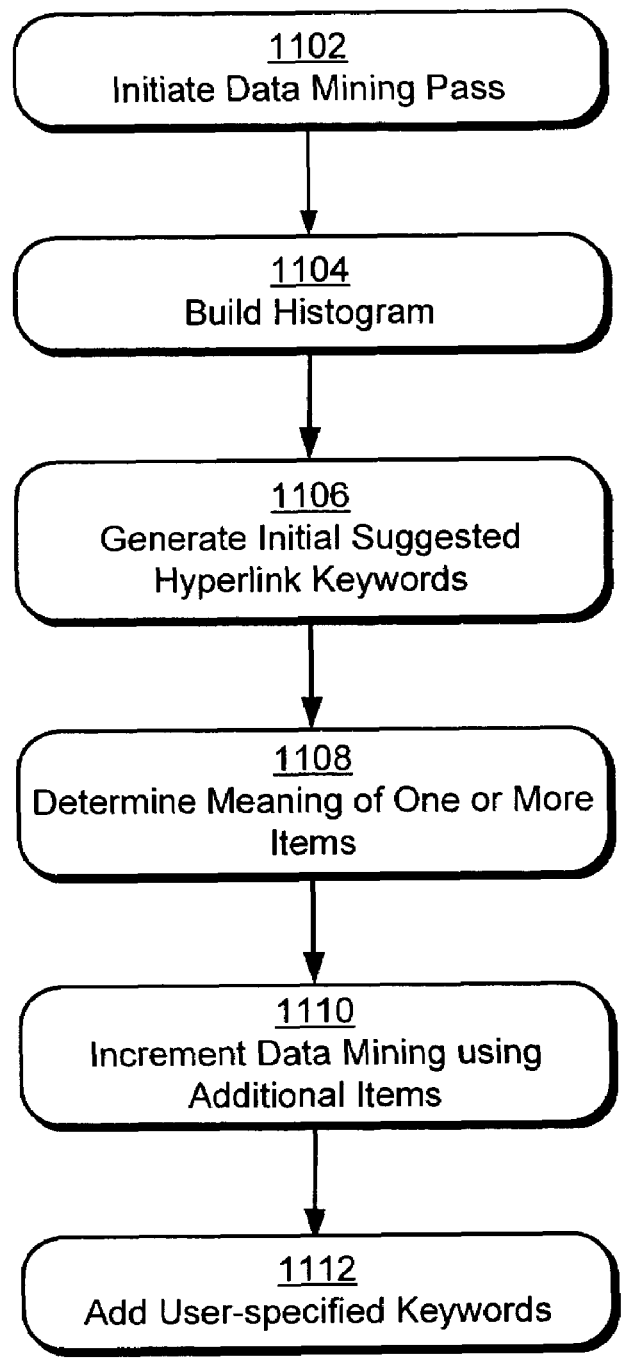
FIG. 11 is a flow diagram depicting a procedure in an exemplary implementation in which data mining is performed to determine a meaning of a message.

FIG. 11 is a flow diagram depicting a procedure 1100 in an exemplary implementation in which data mining is performed to determine a meaning of a message. The data mining described in this procedure 1100 is one of a variety of examples which may be utilized to perform the data mining (block 1010) of FIG. 10. A data mining pass is initiated (block 1102). For instance, a data mining database may be located and tables created which store information found during the data mining. For example, a keyword table may be initiated that contains words or phrases that could appear in hyperlinks. The keyword table may have columns that describe the keyword or phrase, whether the keyword is active as a hyperlink (such that it can be enabled for navigation or disabled which still allows statistics to be tracked for later enablement), source (e.g., auto, user, sender), user resolved (e.g., how many times the user selected the corresponding hyperlink), and so on. A word histogram table may also be initiated that includes columns which describe the keyword, the count of instances that the corresponding keyword appears across all items, and the number of items (e.g., messages) that contain the corresponding keyword.

A synonym table may also be included, which is used to link words that are synonyms or close synonyms. The synonym table may include columns that describe the keyword, a second word in a synonym link, and a relation as to how closely the words are related. A hyperlink table may be used to describe hyperlinks between messages, and include a hyperlink word, the message with the hyperlinked word, and a weighting as to how strongly the hyperlink correlates to the message. A variety of other tables may be utilized.

A histogram is then built (block 1104). For example, for each type of item (e.g., contact, message, file, newsgroup, and so on), an enumerator may be selected which corresponds to that type of item. A file path for each item being enumerated is obtained, and the word histogram table adjusted to describe each occurrence of a word and an item having the word (e.g., five occurrences of a keyword in a single item).

After the histograms have been built (block 1104), the histograms are utilized to generate an initial suggest initial hyperlink keywords (block 1106). For example, a ratio of total unique words (e.g., length of histogram table) to total word instances (e.g., sum of word count) will give the average usage of a keyword. The ratio of average usage of a word to the item count may indicate whether it has a relatively "high variance" or "low variance". High variance means it is included a significant number of times in relatively few items, which may suggest that words having such a variance make a good candidate for initial suggest hyperlink words. Word with a low variance, for instance, may be indicative of relatively "low meaning" words (e.g., "the", "a", "to", "about" and so on) and thus shed minimal light on the actual "meaning" of the item that includes those words.

Words may also be recommended by other sources, such as a service, previous execution of the procedure, and so on. In such an instance, a cross check may be performed such that the words are not included multiple times. In an implementation, a "tragedy" file may also be used to exclude particular words related to current, previous or anticipated tragedies, e.g., words relating to a natural disaster.

The meaning of each item is then determined (block 1008). For instance, at this point the histograms are populated with meaningful words. These words may then be utilized to supply a meaning for each of the items by looping back through the items. For each keyword in an item, for instance, a count is collected of how many times that keyword appears in that item. A ratio of keywords word count versus words in the message is measured. A ratio above a threshold may then be utilized to determine if that word contributes "meaning" to the message. Ratios between meaning keywords are also measured and may be stack ranked with the "highest" indicated primary meaning of the item. This process may also be repeated using the synonym table. Thus, the keywords generated (block 1106) may supply the meaning of the items, which may then be utilized to organize the items, e.g., using keyword hierarchies.

After this initial data mining is performed, incremental data mining using additional items (block 1110) may continue. For example, as emails and other items continue to be received by the client 102(*n*), the keyword analysis module 120 may continue to incrementally adjust the tables. In an implementation, a complete data mining pass is re-run if the number of items added incrementally exceeds a certain threshold, e.g., twenty percent, to ensure that the tables do not compound small errors in incremental training to be significant enough to become detectable.

As previously described, user-specified keywords (block 1112) may also be added for data mining purposes. For instance, a user may specify a keyword to be added to the keyword table and histogram table and set as "active". Synonyms may also be added that relate to the added keyword. Although exemplary data mining has been described, it should be apparent that a variety of additional techniques may be employed. For example, keyword phrases chosen for an item may use other items that share the top hyperlinks to determine the best relevant next lower priority hyperlinks, keywords that are synonyms may be removed from a message when displayed, a contrast algorithm may be employed on the keywords (e.g., to find which keyword terms do not overlap, are supersets, have overlaps, and so on), an algorithm may be employed to find broader blanket terms that would widen or narrow the scope of keywords, and so forth. Further discussion of data mining using keywords may be found in relation to FIGS. 14-17.

Figure 12:
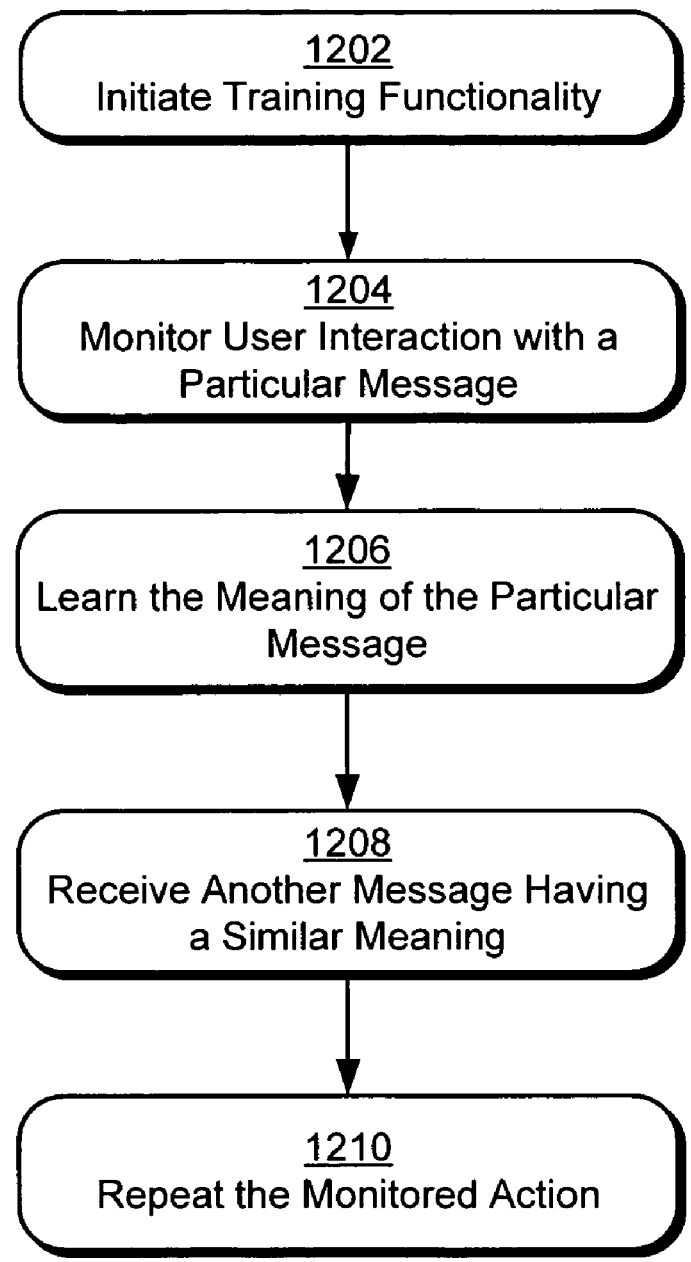
FIG. 12 is a flow diagram depicting a procedure in an exemplary implementation in which a keyword analysis module is trained to handle similar messages as specified by a user.

FIG. 12 is a flow diagram depicting a procedure 1200 in an exemplary implementation in which a keyword analysis module is trained to handle similar messages as specified by a user. As previously described, keywords may be utilized to learn the "meaning" of messages and to find messages and other items having a common meaning. In this example, the keyword analysis module 120 "trains" based on user behavior with similar messages.

Training functionality is initiated by a user (block 1202), such as through selection of a menu item from a drop-down menu, depressing a display of a button in a user interface, and so on. In response to the initiation, user interaction with a particular message is monitored (block 1204), such as through execution of the keyword analysis module. For instance, a user may move a particular message to a particular folder in an email user interface. The meaning of the particular message is learned (block 1206), such as through analysis of keywords as previously described. Therefore, once another message having a similar meaning is received (block 1208), the monitored action may be repeated automatically and without user intervention through execution of the module.

Continuing with the previous example, a subsequent email having similar meaning to the monitored email may be automatically moved to the particular folder. In this way, the user does not need to specify criteria of inbox rules. Rather, an email assistant (e.g., the executable module) watches keywords in an email message when it is assigned to a folder and correlates keywords in emails mapped to folders to determine the auto-created rules to hand incoming email. If the email assistant becomes too "aggressive", the user may move an inappropriate email back to the inbox when again initiating the functionality (block 1202) such that the assistant may learn differences between the emails. Thus, the email assistant may continue to "learn". Although email assistant has been described, other messages (e.g., instant messages) and items may also employ this functionality. Additionally, it should be apparent that use of this learned "meaning" is not limited to local use on the client, but may also be shared, and example of which is described in the following figure.

Figure 13:
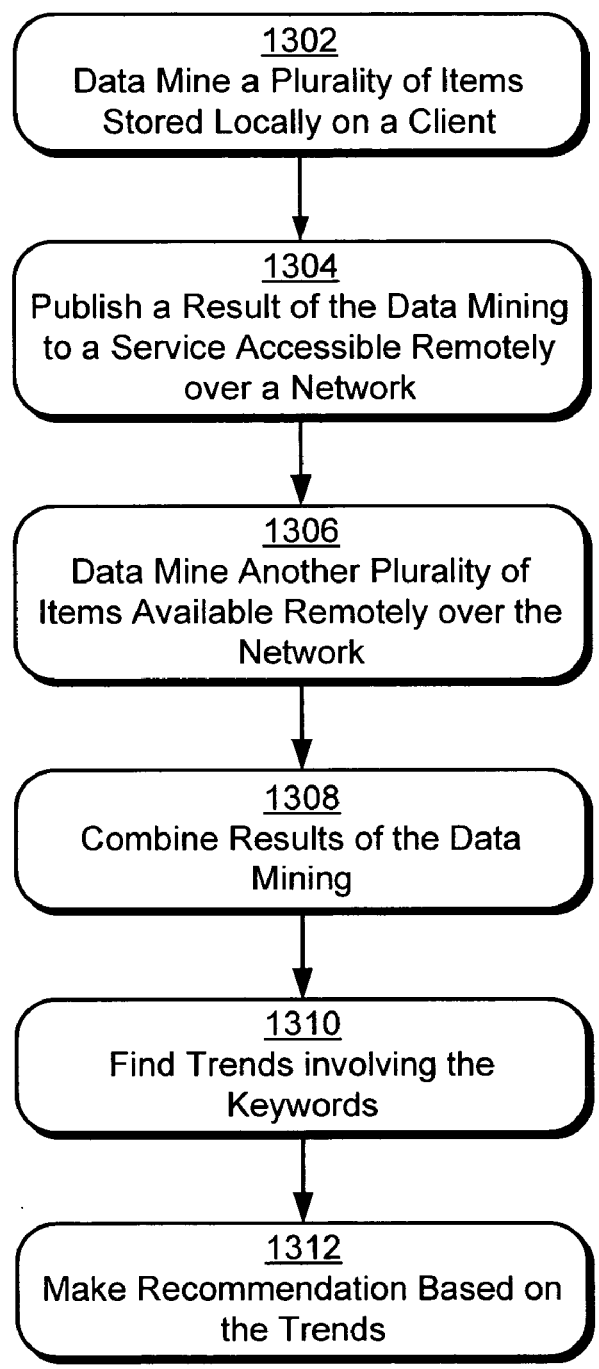
FIG. 13 is a flow diagram depicting a procedure in an exemplary implementation in which results of data mining are published and utilized to make recommendations by a remotely-located service.

FIG. 13 is a flow diagram depicting a procedure 1300 in an exemplary implementation in which results of data mining are published and utilized to make recommendations by a remotely-located service. A plurality of items stored locally on a client is data mined (block 1302) as previously described. A result of the data mining is then published to a service that is accessible remotely over a network (block 1304). For example, the results may be published to the search service 138 of FIG. 1. Additional information may also be included with the results, such as a list of web site listed by the user as favorites, list of music files in the user's music player software, ratings information, list of internet radio stations the user frequents, newsgroup subscriptions, commercial contacts, email newsletter subscriptions, user tile, games, applications, and so on.

Another plurality of items are data mined that are available remotely over the network (block 1306). For example, web site frequented by the user through an Internet service provider may be monitored. The results of the data mining may then be combined (block 1308) which therefore describes local and remote interaction by the user. The service may then utilize this information to find trends involving the keywords (block 1310) and make recommendations based on the trends (block 1312). For instance, advertisements, other web sites, songs, and so on may be suggested based on the "meaning" of items, with which, the user has interacted. Although local and remote data mining has been described in this example, in other examples the data mining may be limited to either local or remote items.

Figure 14:
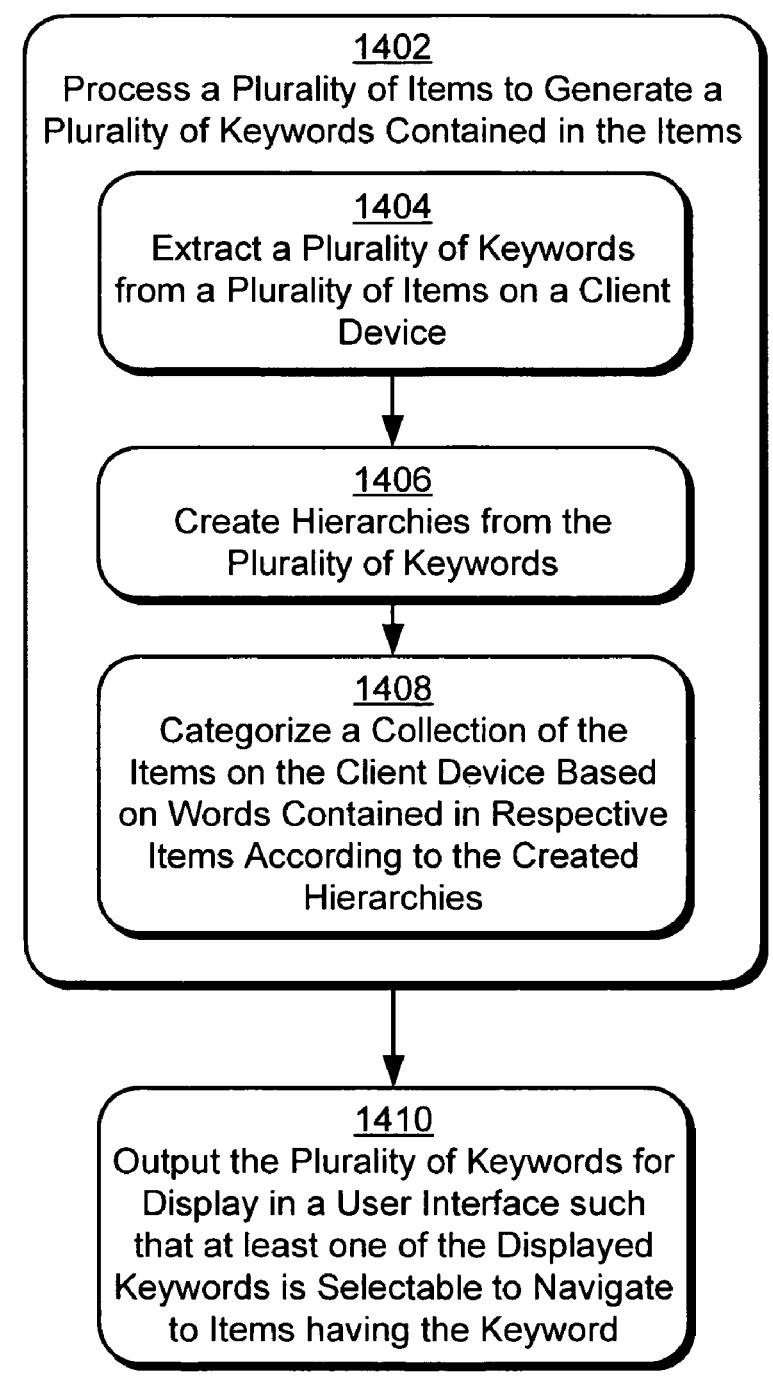
FIG. 14 is a flow diagram depicting a procedure in an exemplary implementation in which a plurality of items is processed to generate a display of keywords for navigation to items having the keywords.

FIG. 14 is a flow diagram depicting a procedure 1400 in an exemplary implementation in which a plurality of items are processed to generate a display of keywords for navigation to items having the keywords. A plurality of items is processed to generate a plurality of keywords contained in the items (block 1402). For instance, the client 102(*n*) includes a plurality of items configured as messages 114 (e.g., emails and instant messages), documents 116, and other 118 electronically-storable items. These items 110(*i*) may be utilized to describe the client's 102(*n*) environment, such as words commonly encountered by the client 102(*n*) and how those words are utilized, e.g., in relation to other words in the items 110(*i*). Therefore, the items 110(*i*) stored on the client 102(*n*) may be utilized to give a context to the items, and consequently an organizational structure for navigating through the items.

For example, during the processing, the keyword analysis module 120 may extract a plurality of keywords from a plurality of items on a client device (block 1404). For instance, the keyword analysis module 120 may generate a dictionary describing each word contained in the plurality of items 110 (*i*) and the number of occurrences of each of the words. Hierarchies may then be created from the plurality of keywords (block 1406). A determination may be made, for instance, as to the "closeness" of each of the plurality of keywords, one to another. This closeness may be utilized to construct a plurality of hierarchical levels and arrange keywords within those levels in parent/child relationships, such as "feature", "search" and "MS Search" as depicted in FIG. 3.

The keyword analysis module 120 (and/or the communication module 108(*n*)) may then categorize a collection of the items on the client device based on word contained in the respective items and according to the created hierarchies (block 1408). For instance, a subset of the items may be categorized according to the hierarchy created for the plurality of items stored on the client 102(*n*). Thus, the arrangement of the emails in the subset (e.g., the emails) in this instance may be dependent at least in part on other items stored on the client. A variety of other processing techniques may also be employed, further discussion of which may be found in relation to FIGS. 7-10.

The plurality of keywords are then output for display in a user interface such that at least one of the displayed keywords is selectable to navigate to items having the keyword (block 1410). For instance, the plurality of keywords in the keyword hierarchy 134(*n*) may be displayed as shown in the keyword hierarchy pane 404 of the user interface 400 of FIG. 4. The displayed keywords are selectable to cause items corresponding to the keyword to be output for display in the keyword preview pane 406. In this way, the client may navigate through the items using the keywords arranged in the hierarchy. A variety of other techniques may also be utilized for selection of keywords, further discussion of which may be found in relation to FIG. 10.

Figure 15:
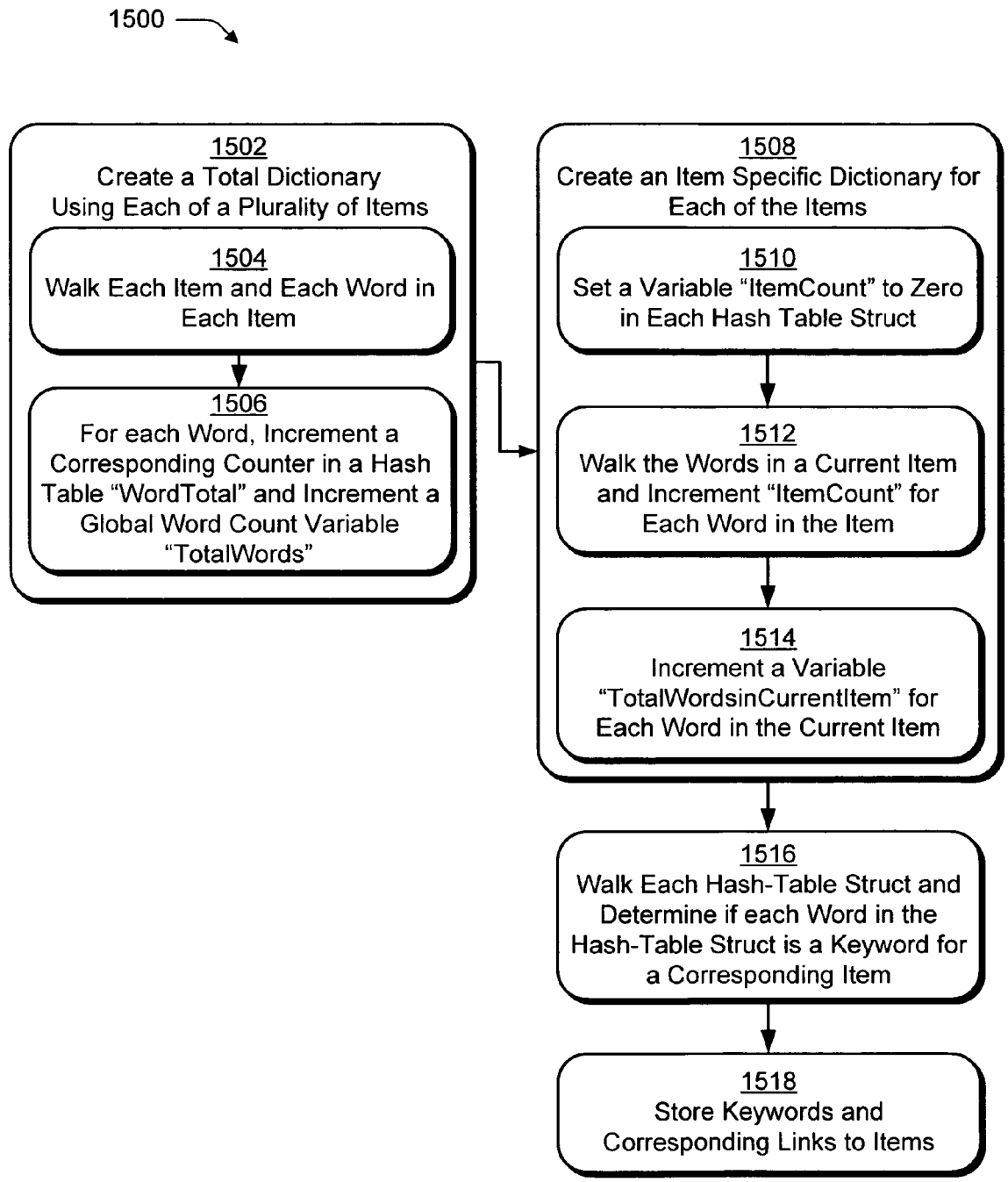
FIG. 15 is a flow diagram depicting a procedure in an exemplary implementation in which a keyword lexicon having a subset of words contained in a plurality of items is calculated from the plurality of items.

FIG. 15 is a flow diagram depicting a procedure 1500 in an exemplary implementation in which a keyword lexicon having a subset of words contained in a plurality of items is calculated from the plurality of items. A total dictionary is created using each of a plurality of items (block 1502). For example, each item and each word in each item is walked (block 1504). For each word, a corresponding counter in a hash table is incremented and a global word count variable is also incremented (block 1506). Thus, once each of the items is walked, a dictionary is obtained which describes each of the words in each of the items.

An item specific dictionary for each of the items is then created (block 1508) by re-walking each item. First, a variable "ItemCount" is set to zero in each hash table struct (block 1510). A "struct" is short for "structure", which is a programming term meaning a data group having related variables. An item is then set as "current" and the words in the current item are walked, incrementing the variable "ItemCount" for each word in the item (block 1512). Additionally, a variable "TotalWordsinCurrentItem" is incremented for each word in the current item (block 1514).

Once each of the items is walked, each hash-table struct is walked to determine if each word in the hash-table struct is a keyword for a corresponding item (block 1516). For instance, a hash-table word may be considered a keyword for that item if a ratio of "ItemCount/TotalWordsinCurrentItem" to "WordTotal/TotalWords" exceeds a threshold. Based on this determination, the keywords are stored with links to corresponding items (block 1518). In an implementation, if the number of keywords per item is limited by another threshold.

Figure 16:
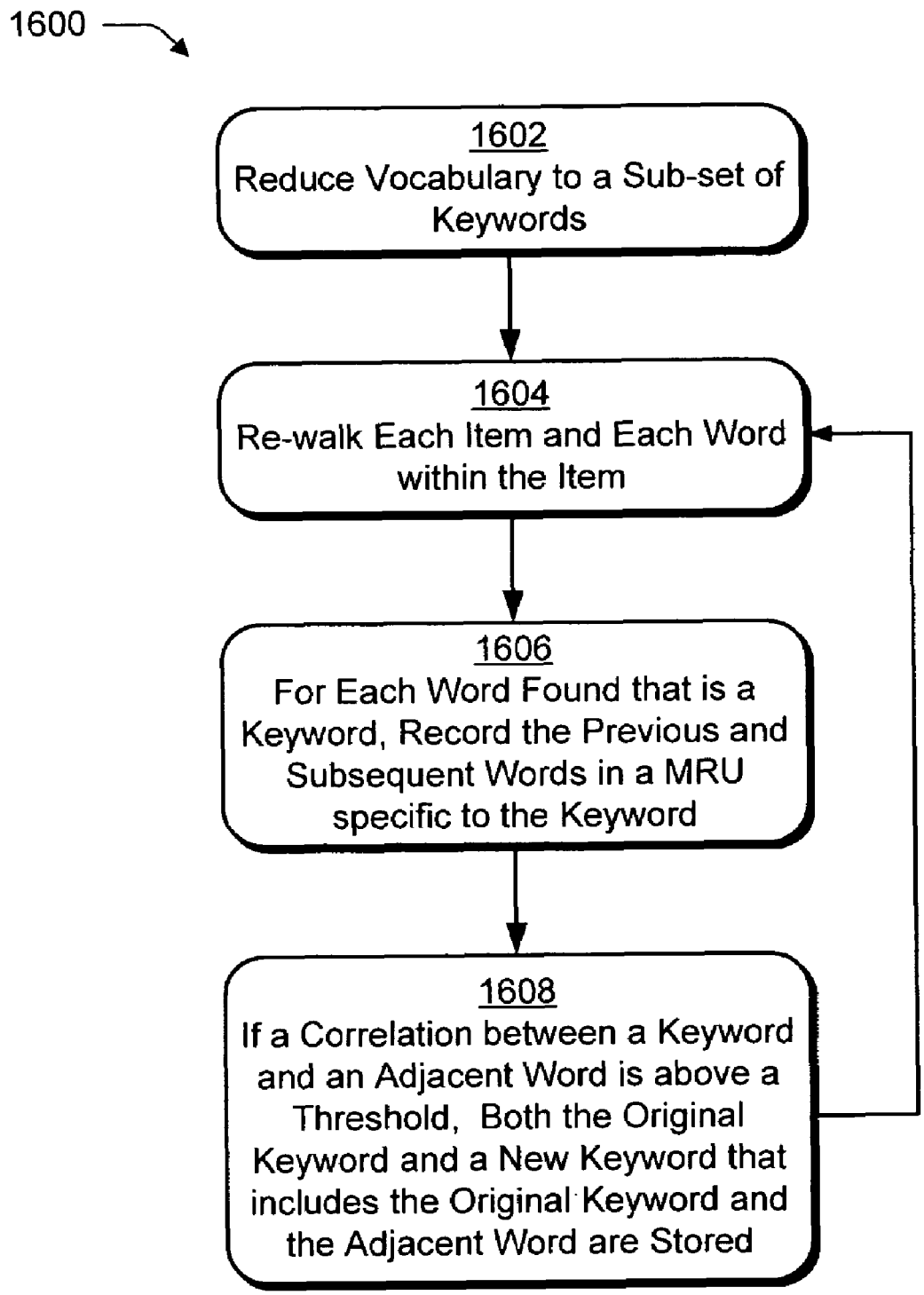
FIG. 16 is a flow diagram depicting a procedure in an exemplary implementation in which keyword phrases having multiple keywords are generated from a plurality of items for use in configuring a keyword hierarchy.

FIG. 16 is a flow diagram depicting a procedure 1600 in an exemplary implementation in which keyword phrases having multiple keywords are generated from a plurality of items for use in arranging a keyword hierarchy. A vocabulary of words included in a plurality of items is reduced to a subset of keywords (block 1602). For instance, the method 1500 of FIG. 15 may be employed to create a subset of keywords as previously described.

Each item and each word within the item is re-walked (block 1604). For each word that is a keyword, the previous and subsequent words are recorded in a minimal revisable unit (MRU) that is specific to the keyword (block 1606). In an implementation, the word before or after the keyword is skipped if the keyword is at the beginning or end of a sentence.

If a correlation between a keyword and an adjacent word is above a threshold, then both the original keyword and a new keyword (e.g., keyword phrase) that included the original keyword and the adjacent word are stored (block 16016). This procedure 1600 may be repeated to obtain keyword phrases having three or more keywords (e.g., blocks 1604-1608). Thus, keyword phrases having multiple keywords may also be utilized to organize items, such as "MS Search" as depicted in FIGS. 3-5.

Figure 17:
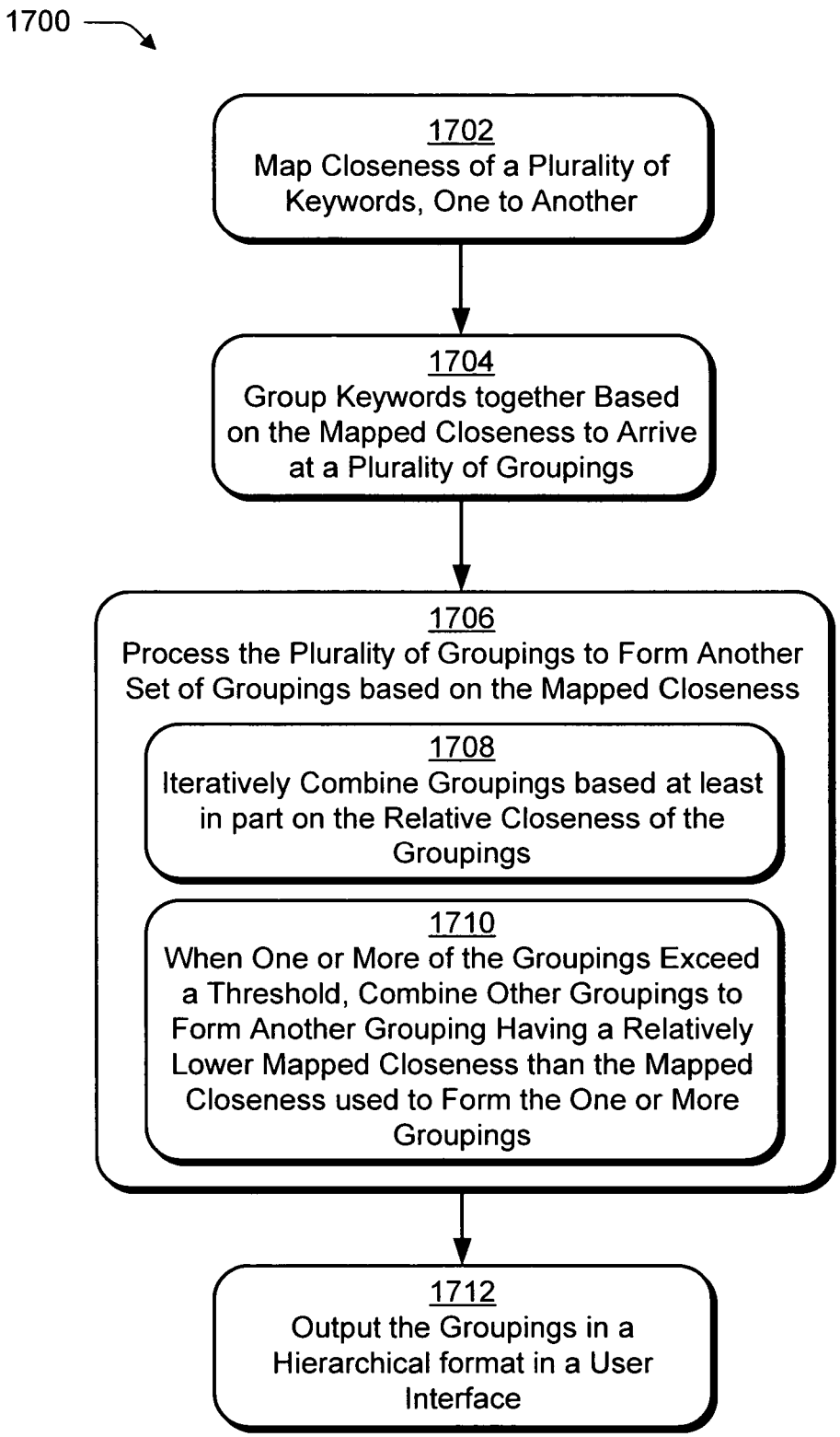
FIG. 17 is a flow diagram depicting a procedure in an exemplary implementation in which a keyword hierarchy is calculated.

FIG. 17 is a flow diagram depicting a procedure 1700 in an exemplary implementation in which a keyword hierarchy is calculated. In an implementation, it is desirable to group items into a few "high level" categories, e.g., three to six categories. Additional hierarchical levels are then created which may each further subdivide into smaller categories. Keywords may be utilized to provide each of these categories and links provided from the keyword to items having the keyword. In this way, the keywords may be utilized to navigate to items having the keyword as previously described.

Closeness is mapped for a plurality of keywords, one to another (block 1702). The keywords are then grouped together based on the mapped closeness to arrive at a plurality of groupings (block 1704). For instance, the plurality of keywords may be "latched" together to form a multitude of small groupings, with most containing two keywords.

The plurality of groupings is then processed to form another set of groupings based on the mapped closeness (block 1706). For example, the keyword analysis module 120 may iteratively combine groupings based at least in part on the closeness of the groupings (block 1708). When one or more of the groupings exceed a threshold, other groupings are combined to form another grouping having a relatively lower mapped closeness than the mapped closeness used to form the one or more groupings (block 1710). In this way, the keyword analysis module 120 may prevent one or more of the groupings from including an inordinate number of keywords, thereby approximately balancing the groupings, one to another. The groupings are then output in a hierarchical format in a user interface (block 1712). A variety of algorithms and techniques may be utilized to perform generate these groupings.

The procedure 1700 of FIG. 17, for example, may be utilized to generate a list of keywords for each item and may be arranged in order of priority. A number of divisions (e.g., categories) is then determined for creation at a "top level" of the hierarchy, such as three to six categories.

A hash table of the keywords is created, each of which including the following data:

- "ItemswithTopKeyword", which represents a number of items having this keyword as the "top" (i.e., root) keyword;
- "ItemsKeywordRank", which represents a number of a sum of ranks of items that have this keyword, the rank for an item depends on "how high" the keyword is prioritized for an item;
- "TopAdjacentKeyword", which points to the keywords that are most likely included in items with this as a primary keyword, this may be ordered in an array where array index 0 is more likely that 1, 1 is more likely than 2, and so on; and
- "TopAdjacentKeywordsCloseness", which stores closeness values for each of the top adjacent keyword, which is described in greater detail below.

For each keyword, the following steps are repeated to create a closeness value for each value in "TopAdjacentKeywords". First, a number of points which refer to the keyword is computed and an inertia of 10,000 is utilized to start. Each "TopAdjacentKeywords" keyword is walked and inertia is divided by three for each array index in "TopAdjacentKeywords" that is entered. Further, a calculation is made to divide by three for each step in distance the keyword is located away from the home keyword. Two or three steps away from the home keywords are then taken. Each time a "TopAdjacentkeyword" value points back to a home keyword, the current inertia is added to the closeness value.

An ordered closeness list is then created from the closeness values computed above and structs are inserted into the ordered list. A keyword pointer is used to point to the corresponding keyword struct and a "TotalCloseness" value is utilized to represent a sum of values in "TopAdjacentKeywordsCloseness". The structs are inserted in an order depending on their corresponding "TotalCloseness" values, from largest to smallest. Further, "TopAdjacentKeywordsCloseness" values are added in each direction.

"Islands" (i.e., groups) are then created from the keywords based on the closeness values. For instance, a variable "CurrentIslands" is set to one. The following steps are then repeated. A first item in the ordered closeness list is selected along with the closest keyword, based on "TopAdjacentKeywordsCloseness", both of which are set to "CurrentIslands". If one of the two keywords already has a variable "Island" set, that value is used instead. If both keywords have the variable "Island" set, then the lowest value of the two is used. Each obsolete "Island" value is replaced. If "CurrentIslands" is used, then "CurrentIslands++" is performed. In an implementation, a look aside value is used for "Island" values. Further, a total may be kept of keywords which are tied to each island such that none of the "top" islands include an inordinate number of keywords. In this example, the previous step "widdles" the number of islands down to a desired three to six range which is a final result of the top level of the hierarchy. These steps may be repeated within any one level of the hierarchy such that each level of the hierarchy is "balanced". A variety of other techniques may be utilized to balance the islands of the hierarchy without departing from the spirit and scope thereof.

Figure 18:
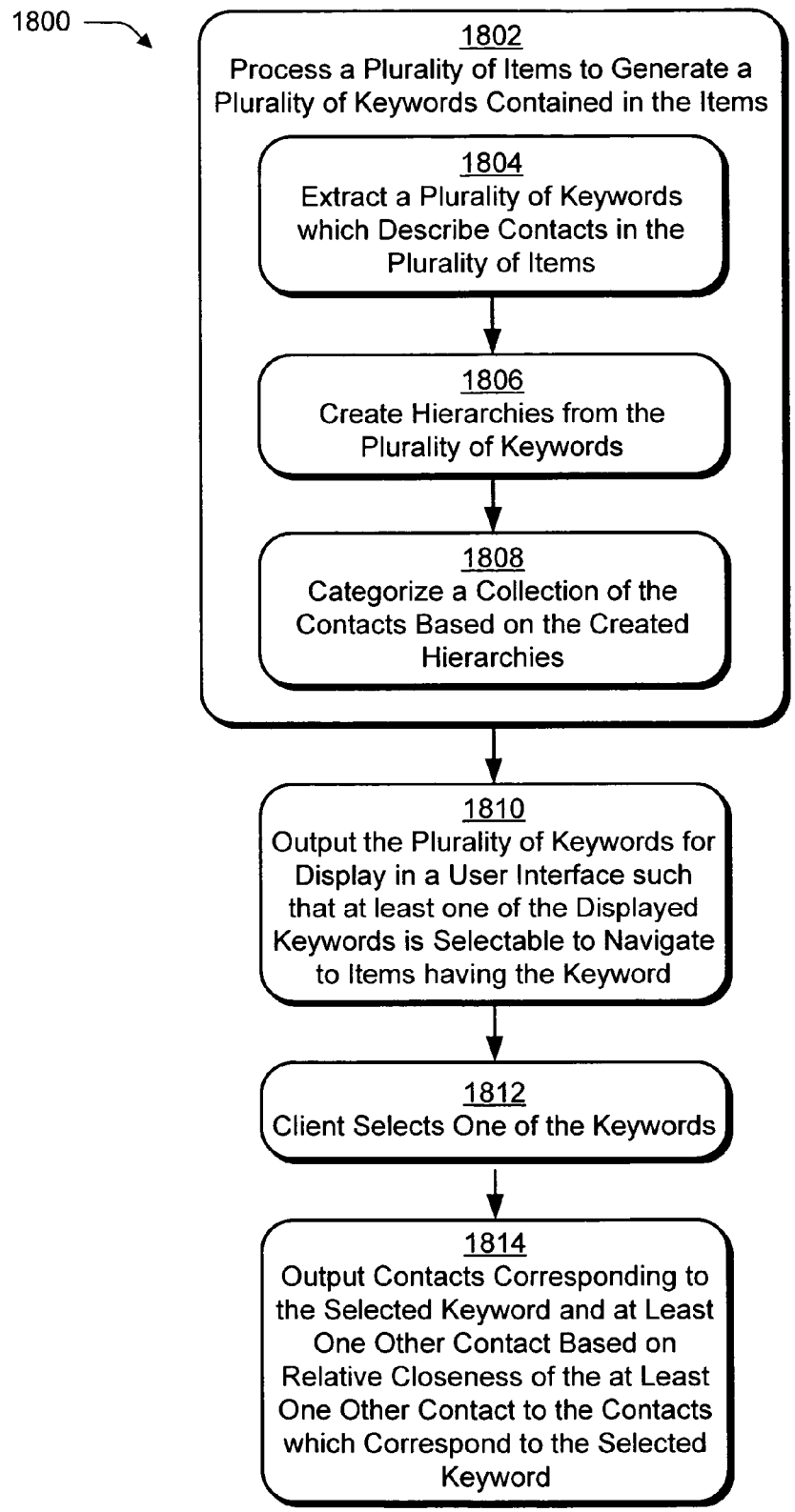
FIG. 18 is a flow diagram depicting a procedure in an exemplary implementation in which contacts are organized according to a keyword hierarchy.

FIG. 18 is a flow diagram depicting a procedure 1800 in an exemplary implementation in which contacts are organized according to a keyword hierarchy. In the previous examples, emails were arranged according to a keyword hierarchy. However, the keyword analysis and arrangement techniques may be utilized for a variety of other items.

For example, a plurality of items may be processed to generate a plurality of keywords contained in the item (block 1802). As before, a variety of items may be examined, such as documents, emails, appointments, contacts, instant messages, and so on. However, in this instance a plurality of keywords are extracted which describe contacts in the plurality of items (block 1804), which are used to create hierarchies (block 1806). A collection of the items (in this instance contacts) are then categorized based on the created hierarchies (block 1808). For example, the extraction, creation and categorization may be performed such that a level, at which, a contact appears in the hierarchy is dependent on how often that contact appears in the items. Within that level of the hierarchy, contacts may be grouped based on how often they appear together in the items.

In an implementation, keywords are created for representing groups of contacts to give context to a group of contacts instead of using a single contact as the "head" of a sub-hierarchy. For example, the keywords used to represent the group may be found by extracting keywords that are shared among the set of contacts.

The plurality of keywords is output for display in a user interface such that at least one of the displayed keywords is selectable to navigate to items having the keyword (block 1810). A client then selects one of the keywords (block 1812). In response to the selection, the keyword analysis module may output contact corresponding to the selected keyword and at least one other contact based on relative closeness of the at least one other contact to the contacts which correspond to the selected keyword (block 1814). In this way, the keyword analysis module may "suggest" an additional contact based on the past history of the client in dealing with the contact. For instance, the client may have a history of dealing with a group of contacts together. Therefore, when the client selects a keyword corresponding to one of the contacts, the rest of the contacts may be output for display and selection by the client.

Figure 19:
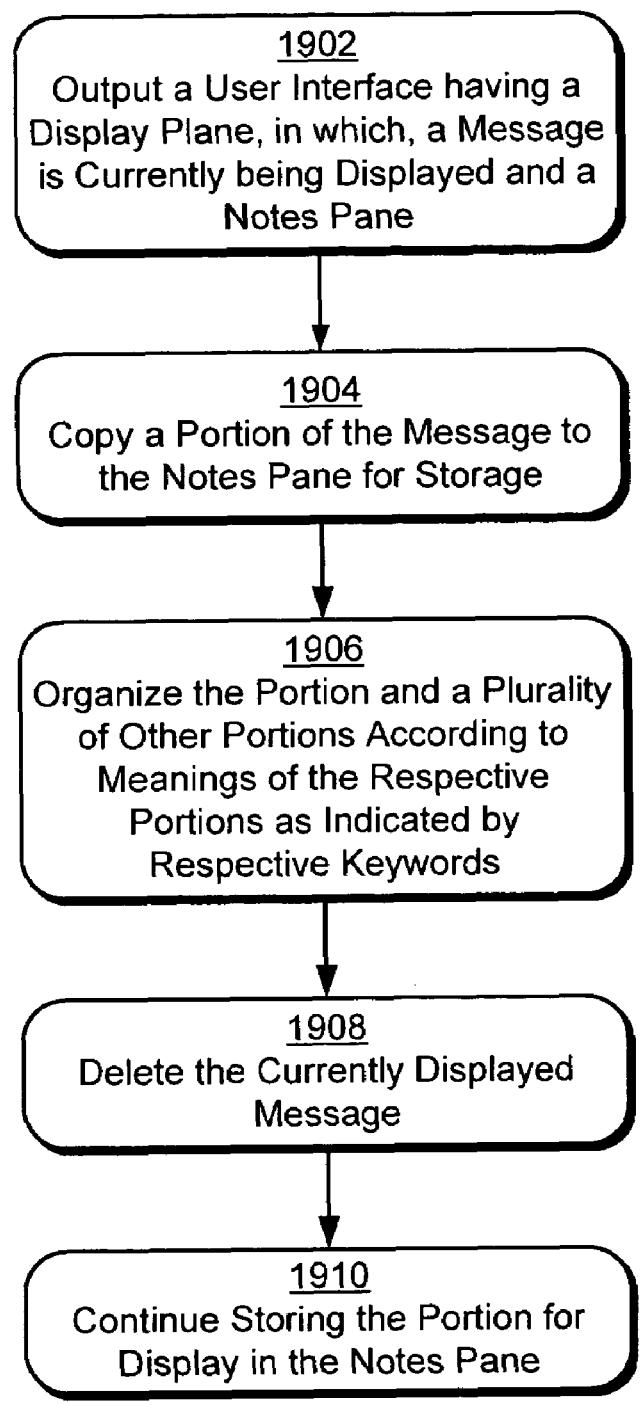
FIG. 19 is a flow diagram depicting a procedure in an exemplary implementation in which a user interface configured to display messages includes a notes portion which is utilized to store and organize portions of the displayed messages.

FIG. 19 is a flow diagram depicting a procedure 1900 in an exemplary implementation in which a user interface configured to display messages includes a notes pane which is utilized to store and organize portions of the displayed messages. A user interface is output having a notes pane and a display pane, in which, a message is currently being displayed (block 1902). For example, the user interface 900 of FIG. 9 includes a preview pane 408 having a current display of an email and a notes pane 902. A portion of the message is copied to the notes pane for storage (block 1904). For instance, the user may select the directions from the currently displayed email and drag the selected directions to the notes pane 902, which is illustrates as portion 904.

The portion and a plurality of other portions are organized according to meanings of the respective portions as indicated by respective keywords (block 1906). For example, the notes pane 902 may include keywords which are implemented as hyperlinks to portions which include the keywords, which are illustrated as "London", "Langham Hotel", "Work" and "Personal". In this way, particular portions of the messages which are of interest to the user are organized separately from the messages themselves. Therefore, even when the currently display message is deleted (block 1908) the portion may continue to be stored for display in the notes pane (block 1910).

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:

outputting a user interface having a user-selectable portion and a plurality of panes, wherein the user interface comprises:
- a first pane that is configured to display a plurality of items;
- a second pane that is configured to display a user-selected message; and
- a third pane that is configured to display one or more hyperlinks associated with one or more of a plurality of items displayed in the first pane, wherein the first, second and third pane are displayed simultaneously in a window on the user interface;

displaying, in the first pane, a plurality of items;

selecting a message from the plurality of items in the first pane and displaying the message in the second pane;

data mining the plurality of items and the message to locate keywords and map closeness of the keywords, one to another, wherein the closeness involves criteria that define relevancy between the message and each of the items;

automatically searching the plurality of items based on keywords from the data mining that are contained in the message currently being displayed in the second pane to determine one or more keywords having a closeness that exceeds a threshold, wherein the one or more determined keywords facilitate the identification of one or more of the plurality of items displayed in the first pane that are relevant to the message;

identifying, in the message displayed in the second pane, the one or more determined keywords; and displaying, in the third pane, one or more hyperlinks associated with the one or more determined keywords contained in the message that are selectable to navigate to one or more of the identified one or more of the plurality of items displayed in the first pane that are relevant to the message, wherein at least one of the one or more hyperlinks comprise a determined keyword.

2. The method as described in claim 1, wherein the closeness involves criteria that define relevancy of one to another of the plurality of items.

3. The method as described in claim 1, wherein:

the user interface includes an entry portion that is configured to accept one or more keywords; and the automatically searching is further performed based on the one or more keywords and the message currently being displayed.

4. The method as described in claim 1, wherein the plurality of items and the message are data mined by:

forming a single dictionary of keywords for the plurality of items and the message; and forming a dictionary of keywords for each of the plurality of items and the message.

5. The method as described in claim 1, wherein the automatically searching is performed for the message and the plurality of items that are configured as email, instant messages, contacts, appointments, documents, newsgroups and web pages that are accessible via a client device that outputs the user interface.

6. The method as described in claim 1, wherein the automatically searching is performed for items available remotely via a network.

7. The method as described in claim 1, further comprising arranging results of the searches into one or more keyword hierarchies based on keywords contained in the message and the respective items.

8. The method as described in claim 7, wherein the arranging includes:

forming a plurality of groupings of the keywords based on the mapped closeness; and combining the plurality of groupings until a predetermined number of groupings remain.

9. One or more computer-readable media comprising computer executable instructions recorded thereon that, when executed, direct a computer to perform a method, the method comprising:

generating a folders pane that is configured to display at least one folder and a plurality of items;

generating a display pane that is configured to display a message communicated over a network, wherein a message is selected for display, in the display pane, from a plurality of items displayed in the folders pane;

executing an analysis module to data mine the message currently being displayed in the display pane and the plurality of items displayed in the folders pane to locate keywords and map closeness of the keywords, one to another, wherein the mapping of the closeness involves determining criteria that define relevancy between the message currently being displayed in the display pane and each of the other items displayed in the folders pane, wherein keywords having a closeness that exceeds a threshold are determined, the determined keywords being a subset of a plurality of words contained in the message displayed in the display pane, wherein the determined keywords facilitate the identification of one or more of the plurality of items displayed in the folders pane that are relevant to the message displayed in the display pane;

generating a search pane having an entry portion configured to accept one or more optional additional keywords and perform a search based on the determined keywords in the message currently being displayed in the display pane and the one or more optional additional keywords, the search pane further configured to have a display portion containing one or more hyperlink, wherein each of the one or more hyperlink is selectable to navigate to one or more of the plurality of items displayed in the folders pane that are relevant to:

the message currently being displayed in the display pane, and the one or more optional additional keywords entered in the entry portion of the search pane, wherein in the event at least one of the one or more optional additional keywords entered in the entry portion of the search pane are relevant to at least one of the plurality of the folders pane, at least one of the one or more hyperlink comprise at least one of the one or more optional additional keywords entered in the entry portion of the search pane, wherein the folders pane, display pane and search pane are displayed simultaneously in a window on a user interface.

10. The method as described in claim 9, wherein the search is performed for items stored locally on the computer and for items available remotely over a network.

11. The method as described in claim 9, wherein the entry portion accepts the one or more keywords that are selected by a user from the message currently being displayed in the display pane.

12. The method as described in claim 9, wherein:

the method further comprises outputting a user-selectable portion that, when selected, maps closeness of keywords, one to another, that are contained in a plurality of items stored on the computer; and the search pane is not configured to perform the search on said items available remotely over a network until the user-selectable portion is selected.

13. The method as described in claim 9, wherein the method further comprises generating a notes pane that is configured to include portions of messages copied from the display pane.

14. One or more computer-readable media comprising computer executable instructions recorded thereon that, when executed, direct a computer to perform a method, the method comprising:

generating a folders pane configured to display at least one folder and a plurality of items;

generating a display pane configured to display messages communicated over a network, wherein a message is selected for display in the display pane from a plurality of items displayed in the folders pane;

generating a notes pane displayed concurrently with the display pane, the notes pane configured to include portions of messages copied from the display pane, the notes pane further configured to have a display portion containing one or more hyperlink, wherein each of the one or more hyperlink is selectable to navigate to one or more of a plurality of items displayed in the folders pane, wherein the folders pane, display pane and notes pane are displayed simultaneously in a window on a user interface; and generating an analysis module configured to data mine portions of the user interface, the portions of the user interface comprising:

a message currently being displayed in the display pane;

portions of messages currently being displayed in the notes pane; and a plurality of items currently being displayed in the folders pane, wherein the data mining comprises:

locating keywords common among the portions of the user interface;

mapping the closeness of the keywords, one to another;

determining keywords having a closeness that exceeds a threshold; and associating the one or more hyperlinks in the display portion of the notes pane with the determined keywords.

15. The method as described in claim 14, wherein the portions copied from the display pane are displayable in the notes pane after deletion of respective said messages.

16. The method as described in claim 14, further comprising organizing the portions of the messages in the notes pane based on keywords contained in the portions of the messages in the notes pane.

17. The method as described in claim 16, wherein the portions of the messages are organized in keyword hierarchies.

\* \* \* \* \*

UNITED STATES PATENT AND TRADEMARK OFFICE
CERTIFICATE OF CORRECTION

| | | |
|---|---|---|
| PATENT NO. | : 7,444,328 B2 | Page 1 of 1 |
| APPLICATION NO. | : 11/249200 | |
| DATED | : October 28, 2008 | |
| INVENTOR(S) | : Bryan T. Starbuck | |

It is certified that error appears in the above-identified patent and that said Letters Patent is hereby corrected as shown below:

On the Title Page
Item (57), under "Abstract" line 4, delete "example." and insert -- example, --, therefor.

Signed and Sealed this
Twenty-sixth Day of April, 2011

David J. Kappos
*Director of the United States Patent and Trademark Office*